United States Patent
Pacella et al.

(10) Patent No.: US 10,015,278 B2
(45) Date of Patent: Jul. 3, 2018

(54) ADAPTIVE SCHEDULING AND ORCHESTRATION IN A NETWORKED ENVIRONMENT

(71) Applicant: Verizon Patent and Licensing Inc., Arlington, VA (US)

(72) Inventors: Dante J. Pacella, Charles Town, WV (US); Mani Tadayon, Leesburg, VA (US); Syed A. Ahmad, Ashburn, VA (US); Lawrence Richard Rau, Dublin, NH (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 206 days.

(21) Appl. No.: 14/851,754

(22) Filed: Sep. 11, 2015

(65) Prior Publication Data
US 2017/0078442 A1   Mar. 16, 2017

(51) Int. Cl.
*G06F 15/173*  (2006.01)
*H04L 12/66*  (2006.01)
*H04L 29/08*  (2006.01)

(52) U.S. Cl.
CPC ........ *H04L 67/325* (2013.01); *H04L 67/1008* (2013.01)

(58) Field of Classification Search
CPC ... H04L 29/08072; H04L 29/06; H04L 43/00; H04L 12/2602; H04L 41/22; H04L 49/101; H04L 49/254; H04Q 11/04; H04Q 11/0478; H04Q 11/0407
USPC ....................................................... 709/224
See application file for complete search history.

(56) References Cited

U.S. PATENT DOCUMENTS

| | | | | |
|---|---|---|---|---|
| 8,224,334 B1 * | 7/2012 | White | ..................... | H04W 8/12 370/360 |
| 2008/0279155 A1 * | 11/2008 | Pratt, Jr. | ................. | H04L 12/66 370/336 |
| 2009/0006528 A1 * | 1/2009 | Batni | ................ | H04M 1/72519 709/203 |
| 2009/0069057 A1 * | 3/2009 | Haartsen | ............. | H04W 72/085 455/574 |
| 2013/0003591 A1 * | 1/2013 | Novak | ................ | H04W 72/085 370/252 |
| 2013/0160062 A1 * | 6/2013 | Carney | ............ | H04N 21/23439 725/95 |
| 2014/0006416 A1 * | 1/2014 | Leslie | ............... | G06F 17/30554 707/748 |

(Continued)

*Primary Examiner* — Mahran Abu Roumi

(57) ABSTRACT

A method, a device, and a non-transitory storage medium to receive a job request to schedule an execution of a process in a networked environment; generate a schedule for the execution of the process based on one or more current schedules directed to concurrent execution of one or more other processes; obtain resource utilization data indicating resource usage stemming from the concurrent execution of the process and the one or more other processes; analyze the resource utilization data; determine whether a resource inefficiency occurred during the concurrent execution based on an analysis of the resource utilization data; generate resource inefficiency data in response to a determination that the resource inefficiency occurred; and generate an adapted schedule for at least one of the process or the one or more other processes in response to a determination that the resource inefficiency occurred.

20 Claims, 21 Drawing Sheets

(56) References Cited

U.S. PATENT DOCUMENTS

| | | | | |
|---|---|---|---|---|
| 2014/0192661 A1* | 7/2014 | Yang | ............... | H04W 36/0088 |
| | | | | 370/252 |
| 2014/0244839 A1* | 8/2014 | Yoon | ............... | H04W 36/26 |
| | | | | 709/224 |
| 2014/0317265 A1* | 10/2014 | James | ............... | H04L 67/1004 |
| | | | | 709/224 |
| 2015/0178124 A1* | 6/2015 | Modani | ............... | G06F 9/4881 |
| | | | | 718/102 |
| 2015/0317081 A1* | 11/2015 | Singh | ............... | G06F 9/48 |
| | | | | 711/114 |
| 2015/0350433 A1* | 12/2015 | Steiner | ............... | H04M 3/5175 |
| | | | | 379/265.03 |
| 2016/0196089 A1* | 7/2016 | Gadre | ............... | G06F 3/0647 |
| | | | | 711/114 |
| 2016/0216986 A1* | 7/2016 | Singh | ............... | G06F 9/45558 |
| 2017/0048854 A1* | 2/2017 | Anand | ............... | H04W 24/02 |
| 2017/0063615 A1* | 3/2017 | Yang | ............... | H04L 41/0806 |

* cited by examiner

| TABLE 475 | |
|---|---|
| NETWORKED DEVICE ID | EVENT DATA |
| ↑ 477 | ↑ 479 |

Fig. 4C

| TABLE 485 | |
|---|---|
| LINK ID | EVENT DATA |
|  |  |
| ↑ 487 | ↑ 489 |

Fig. 4D

ADAPTIVE SCHEDULING AND ORCHESTRATION IN A NETWORKED ENVIRONMENT

BACKGROUND

Resource management in a networked environment can be complex when various applications are executed and various processes are performed. For example, there may be resource inefficiencies and scaling issues that exist within the networked environment.

BRIEF DESCRIPTION OF THE DRAWINGS

FIG. 4C is a diagram of an exemplary table that stores exemplary resource utilization data pertaining to the networked environment;

FIG. 4D is a diagram illustrating another exemplary table that stores exemplary resource utilization data pertaining to the networked environment;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Resource management in a networked environment can cause resource inefficiencies and scaling issues when applications compete for the use of limited resources. For example, assume two long-lived applications, which have processes in separate containers, such as application 1-container 1, application 1-container 2, application 2-container 1, and application 2-container 2, reside on a same physical device (also referred to in the art as the "host"). The container 1 process executes a task every five minutes and the container 2 process executes a task every minute. These tasks increase central processing unit (CPU) and memory utilization by fifty percent when they run, which causes an orchestration system to scale up each container and move other containers away to make room for the scale up requests. According to this scenario, at the five minute mark, the orchestration system receives four scale-up requests from each of the containers. As a consequence, resource and scaling issues are created and negatively impact the virtualized environment. Additionally, these issues can be exacerbated when the virtualized environment uses a precision timing service (e.g., the Precision Time Protocol (PTP), etc.). For example, the precision timing service may cause each independent process to access or use the available resources during a same absolute and overlapping time interval.

When considering this issue on a larger scale where thousands of applications with hundreds of affiliated containers are involved, across a plethora of time interval profiles, the problem can appear to be insurmountable. Even when the virtualized environment includes some measures to address this issue, the overall system must scale for the peak demand time interval, however brief in duration, which may create resource and orchestration service inefficiencies. Even further, these issues may occur in any networked environment whether the networked environment is a virtual, container-based network, a non-container-based network, a non-virtual environment, a cloud-based environment, etc. The phrase "networked environment," as used herein, is intended to mean a collection of interworking systems, which can be physical devices, virtual devices, or a combination thereof, connected to one another over any combination of physical, logical, and/or virtual networks. The collection of systems operates as a hybrid of both homogeneous and heterogeneous resource spaces across which a variety of software competes for those resources. The networked environment may include one or multiple networks, of one or multiple types.

Figure 1A:
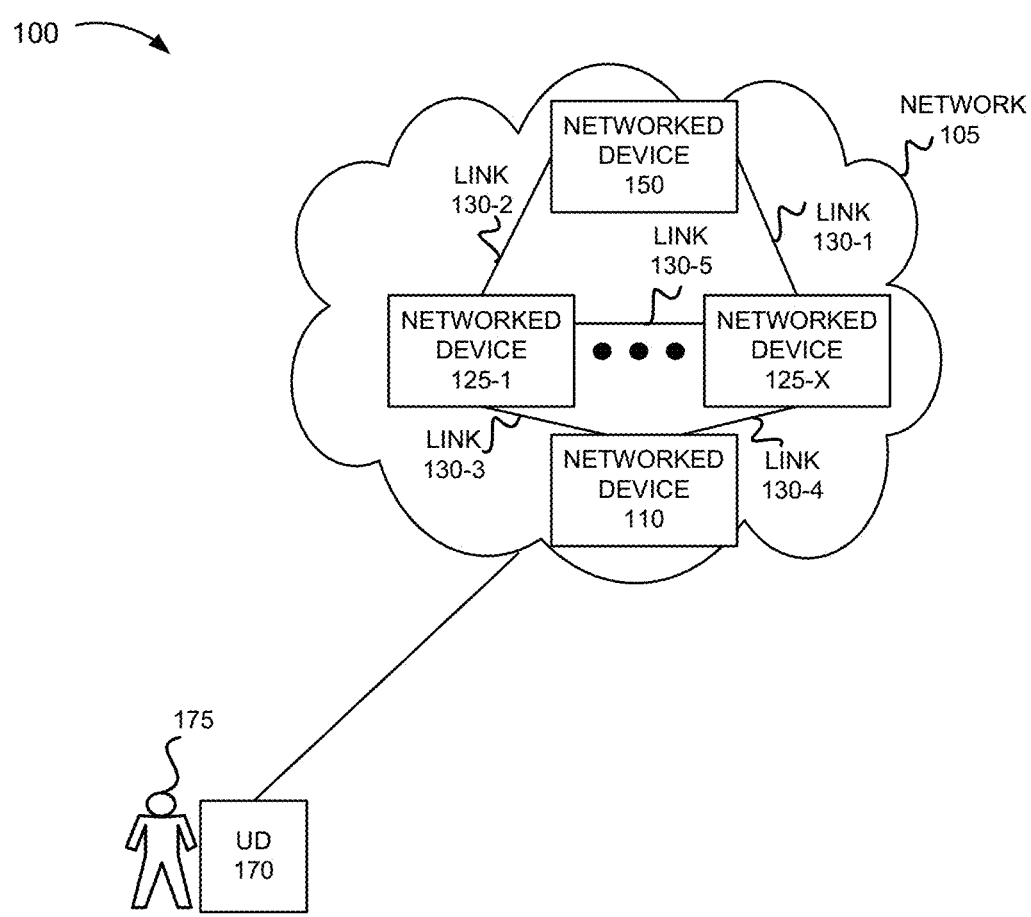
FIG. 1A is a diagram illustrating an exemplary environment in which an exemplary embodiment of a management service may be implemented.

FIG. 1A is a diagram illustrating an exemplary environment 100 in which an exemplary embodiment of a management service may be implemented. As illustrated, environment 100 includes a network 105. Network 105 includes a networked device 110 and networked devices 125-1 through 125-X, in which X>1 (also may be referred to collectively as networked devices 125 and, individually and/or generically as networked device 125). Network 105 also includes a networked device 150. Additionally, environment 100 includes a user device (UD) 170 operated by a user 175. Links 130-1 through 130-5 (also referred to collectively as links 130 and, individually and/or generically as link 130) provide a communication path.

Environment 100 may be implemented to include wireless and/or wired (e.g., electrical, optical, etc.) communication paths/links among the devices and the network illustrated. A connection via a link may be direct or indirect and may involve an intermediary device and/or an intermediary network not illustrated in FIG. 1A. Additionally, the number, type (e.g., wired, wireless, etc.), and the arrangement of links between the devices and the network are exemplary.

A device may be implemented according to a centralized computing architecture, a distributed computing architecture, or a cloud computing architecture (e.g., an elastic cloud, a private cloud, a public cloud, etc.). Additionally, a device may be implemented according to one or multiple network architectures (e.g., a client device, a server device, a peer device, a proxy device, and/or a cloud device).

The number of devices, the number of networks, and the configuration in environment 100 are exemplary. According to other embodiments, environment 100 may include additional devices, fewer devices, and/or differently arranged devices, than those illustrated in FIG. 1A. For example, networked device 110 and/or networked device 150 may include multiple networked devices 110 and/or multiple networked devices 150.

Additionally, or alternatively, environment 100 may include an additional network and/or arrangement of networks that is different from that illustrated in FIG. 1A. For example, network 105 may be connected to another network (not illustrated). The other network may include other networked devices (not illustrated). Also, according to other embodiments, one or more functions and/or processes described as being performed by a particular device or a particular component of a device may be performed by a different device or a different component, or some combination of devices or components, which may or may not include the particular device or the particular component.

Network 105 may include one or multiple networks of one or multiple types. For example, network 105 may include a wired and/or a wireless network. Network 105 may include a private network, a public network, an enterprise network, a service provider network, a data network, a local area network (LAN), a wide area network (WAN), etc. Although not illustrated, network 105 may include other networked devices that pertain to various network-related aspects, such as access control, routing, security, network policies, etc.

Networked device 110 includes a communicative and computational device. For example, networked device 110 may be implemented as a computer. Networked device 110 may also include a mass storage device. For example, the mass storage device may store data pertaining to a management service. Alternatively, for example, networked device 110 may be communicatively coupled to a separate device (not illustrated) to provide storage.

According to an exemplary embodiment, networked device 110 provides the management service, as described herein. The management service includes a scheduling service, an adaptive scheduling service, and an evaluation service directed to networked environment. According to an exemplary embodiment, the management service is directed to a virtualized environment. For example, the virtualized environment may include a virtual, container-based environment. Additionally, or alternatively, the virtualized environment may include virtual machines, hypervisors, etc. According to other embodiments, the management service is directed to other types of networked environments (e.g., bare metal chassis without virtualization software present, etc.).

According to an exemplary embodiment, networked device 110 includes a scheduler that provides the scheduling service. The scheduler schedules the execution of processes in the networked environment. According to an exemplary embodiment, networked device 110 includes an operations analyzer that provides the evaluation service. The operations analyzer may analyze a portion of the networked environment or the entire networked environment. The operations analyzer identifies resource inefficiencies that occur based on the analysis. According to one exemplary embodiment, the operations analyzer compares resource utilization data to operational threshold values. According to another exemplary embodiment, the operations analyzer compares a combination of resource utilization data and derived data (e.g., performance metrics data, execution statistics data, and/or other data derived from and/or generated based on the resource utilization data) to operational threshold values. According to yet another exemplary embodiment, the operations analyzer compares derived data to operational threshold values. For purposes of description, the derived data or a combination of the resource utilization data and the derived data may be referred to as "analytics data." An operational threshold value may include a single parameter value (e.g., x value), multiple parameter values (e.g., x value, y value, z value, etc.) or a range of values (e.g., between x and y values). The operational threshold value may be applicable to a system-wide perspective of the networked environment (e.g., a global, operational threshold value) or a portion thereof (e.g., per node, per grouping of nodes, etc.) (e.g., a non-global, operational threshold value).

The administrator may configure the operational threshold values to determine an amount or a degree of resource inefficiencies that may exist within the networked environment. The inefficiencies may be caused by contention for a resource, a bottleneck, a variation in resource performance, etc. By way of example, the resource utilization data may indicate high usage of a resource (e.g., a processor) during a particular window of time. The operations analyzer may compare processor idle times, processor usage times and levels, etc., included in the resource utilization data to corresponding operational threshold values. Based on a result of the comparison, the operations analyzer may determine the amount or degree of resource inefficiency. According to another example, the analytics data may indicate high resource usage of a resource (e.g., a link) and network latency. The operations analyzer may compare bandwidth usage and a network latency value to corresponding operational threshold values. Based on a result of the comparison, the operations analyzer may determine the amount or degree of resource inefficiency.

According to an exemplary embodiment, the operations analyzer determines whether to generate a resource inefficiency profile based on a result of the comparison between the resource utilization data and the operational threshold values. According to another exemplary embodiment, the operations analyzer determines whether to generate a resource inefficiency profile based on a result of the comparison between the analytics data and the operational threshold values. For example, when the operations analyzer determines that the resource utilization data or the analytics data satisfies the operational threshold values, the operations analyzer determines not to generate the resource inefficiency profile. Alternatively, when the operations analyzer determines that the resource utilization data or the analytics data does not satisfy the operational threshold values, the operations analyzer determines to generate the resource inefficiency profile.

According to an exemplary embodiment, when the operations analyzer determines to generate the resource inefficiency profile, the operations analyzer determines whether to provide the resource inefficiency profile to the scheduler. According to an exemplary embodiment, the operations analyzer uses difference values relative to the operational threshold values to make such a determination. By way of example, the difference between resource utilization data values, derived data values, or analytics data, and the operational threshold values may be indicated as difference values. The difference value may indicate a degree or amount of inefficiency. When the difference value is above a certain difference threshold value, the operations analyzer determines to notify or provide the resource inefficiency profile to the scheduler and store the resource inefficiency profile. Alternatively, when the difference value is below the difference threshold value, the operations analyzer determines not to notify or provide the resource inefficiency profile to the scheduler, and simply stores the resource inefficiency profile. The administrator may access and review the stored resource inefficiency profile.

According to an exemplary embodiment, the scheduler provides the adaptive scheduling service. The scheduler adapts the schedule based on the resource inefficiencies profile. According to an exemplary embodiment, adaptive scheduling techniques are used to reduce or eliminate resource inefficiencies. The adapted schedule may be directed to one process or multiple processes that may be executed on one or multiple networked devices within the networked environment. The process may or may not include transmission and/or reception of data via link 130.

According to an exemplary embodiment, the adaptation of scheduling, by the scheduler, includes using time offsets. For example, the scheduler may use a time offset relative to a time instance at which the process begins execution according to a current schedule, to adapt the timing of the process being executed relative to one or multiple other processes. In this way, the scheduler may reduce contention for a resource between processes executed within the networked environment. By way of further example, assume that the administrator of the networked environment submits a job request pertaining to a process to be executed in the networked environment. The job request includes a timeslot profile, description data, and various parameters pertaining to the process. The scheduler generates a schedule to execute the process based on the timeslot profile, the description data and various parameters included in the job request, the available resources in the networked environment, and existing, scheduled processes. Thereafter, the scheduler receives a resource inefficiency profile that indicates contentions between that process and one or more other processes. According to this example, assume that the process is scheduled to execute every five minutes. Based on the resource inefficiency profile, the scheduler calculates an adapted schedule, which modifies the start time of the process by an offset (e.g., ±2 seconds), to minimize or eliminate the contention. Based on the calculation, the scheduler generates an adapted schedule for the process. The scheduler publishes the adapted schedule and the process is adjusted according to the adapted schedule. As described further below, the scheduler includes logic to consider various parameters in determining whether the offset is permissible, the duration of the offset that is permissible, etc.

According to another exemplary embodiment, the adaptation of the scheduling, by the scheduler, includes moving a process "off node" (e.g., to another networked device). For example, the scheduler instructs a platform manager to tear down a virtual entity (e.g., a containerized process of an application) on networked device 125-1, and spin-up a same virtual entity (e.g., a containerized process of the application) on a networked device 125-2. The scheduler generates an adapted schedule for the moved process and publishes the adapted schedule. The scheduler may also generate an adapted schedule for the networked device on which the process is torn down. Networked device 110 is described further below.

According to yet another exemplary embodiment, the scheduler includes logic to maximize concurrent resource usage. For example, there may be instances, based on monetary costs pertaining to the use of networked device 125, to be incentivized to maximize concurrent resource usage, which may result in minimizing the duration of use of the resources.

Networked device 125 includes a communicative and computational device. For example, networked device 125 may be implemented as a computer. According to an exemplary embodiment, networked device 125 includes a system container (also known as an operating system (OS) container). According to an exemplary implementation, the system container is a Linux container based on the Linux Containers (LXC) infrastructure, which provides an operating system-level virtualization based on namespaces, control groups (cgroups), etc., the details of which go beyond the scope of this disclosure. According to other exemplary implementations, other types of OS containers (e.g., a Solaris container, an Ubuntu container, a proprietary OS container, a future generation OS container, etc) may be used.

According to other embodiments, networked device 125 does not include a system container. For example, networked device 125 may not operate as a virtual, container-based device.

According to an exemplary embodiment, networked device 125 includes an application. According to an exemplary embodiment, networked device 125 includes an application container. According to an exemplary implementation, the application container is implemented as a Docker container. According to other exemplary implementations, other types of application containers (e.g., a Drawbridge container, a proprietary application container, a future generation application container, etc.) may be used.

According to other embodiments, networked device 125 does not include an application container.

The application may be a "long-lived" application or a "short-lived" application. The long-lived application may have deterministic and/or non-deterministic intervals. A process (e.g., a function, a task, an operation, a thread, etc.) of the application may be performed within the container according to a schedule, provided by the management service, as described herein. The number of containers per application may be dynamic (e.g., increase or decrease) based on resource requirements and/or other factors. Alternatively, the process of the application may be performed according to a schedule, provided by the management service, when no containers are used. That is, according to other exemplary embodiments, the application does not operate within an application container and/or operate within an OS container.

According to an exemplary embodiment, networked device 125 includes a management service agent. The management service agent may or may not operate in a container. According to an exemplary embodiment, the management service agent continually monitors the use of resources on networked device 125 and collects resource utilization data based on the monitoring. The resource utilization data represents the resource utilization that occurred during a time period while processes are being executed. The resource may be physical hardware (e.g., a processor, a memory, a hard disk, etc.) of a networked device, link 130 that connects networked devices, an application, and/or service. The resource may be a logical partition or virtual partition across a single networked device or multiple networked devices. The management service agent communicates the resource utilization data to networked device 110, as described further below.

According to an exemplary embodiment, networked device 125 includes a control agent. The control agent may or may not operate in a container. According to an exemplary embodiment, the control agent provides control, scheduling, and execution services within the networked environment. For example, the control agent obtains a schedule to run a process in a networked environment and coordinates the execution of the process based on the schedule. The control agent may also perform other tasks, such as monitoring the health of the networked platform, etc. Networked device 125 is described further below.

Link 130 may be a wireless or a wired path that provides a medium for communication between networked devices of network 105. For example, link 130 may be a fiber optic line, a wireless connection, an electrical cable, etc. Link 130 may have certain characteristics, such as bandwidth capacity, transmission data rate, and the like.

Networked device 150 includes a communicative and computational device and/or a mass storage device. For example, networked device 150 may be implemented as a computer or a network attached storage (NAS) device. Networked device 150 may include one or more of the components described above in relation to networked device 125. For example, networked device 150 may include an application and/or a control agent. Networked device 150 may include a database management system (DMBS) and one or multiple databases or other types of data storage configurations.

According to an exemplary embodiment, networked devices 125 and networked device 150 form a networked environment. For example, the networked environment may include a data center, a cloud, a cluster, a virtual environment, a non-virtual environment, etc. According to an exemplary embodiment, networked device 110 provides the management service of the networked environment. For example, networked device 110 provides the management service directed to a data center, a cloud, a cluster, etc.

User device 170 includes a communicative and computational device. For example, user device 170 may be implemented as a computer (e.g., a desktop, a laptop, etc.), a terminal, a tablet, or other end user device. User device 170 may include a client that allows user 175 to manage the networked environment and the management service. For example, the client may be implemented as a web browser. Alternatively, administrative software for the networked environment may include a client component. User 175 may be an administrator or other user that is authorized to configure, manage, etc., networked devices 110, 125, and 150, network 105, etc.

Figure 1B:
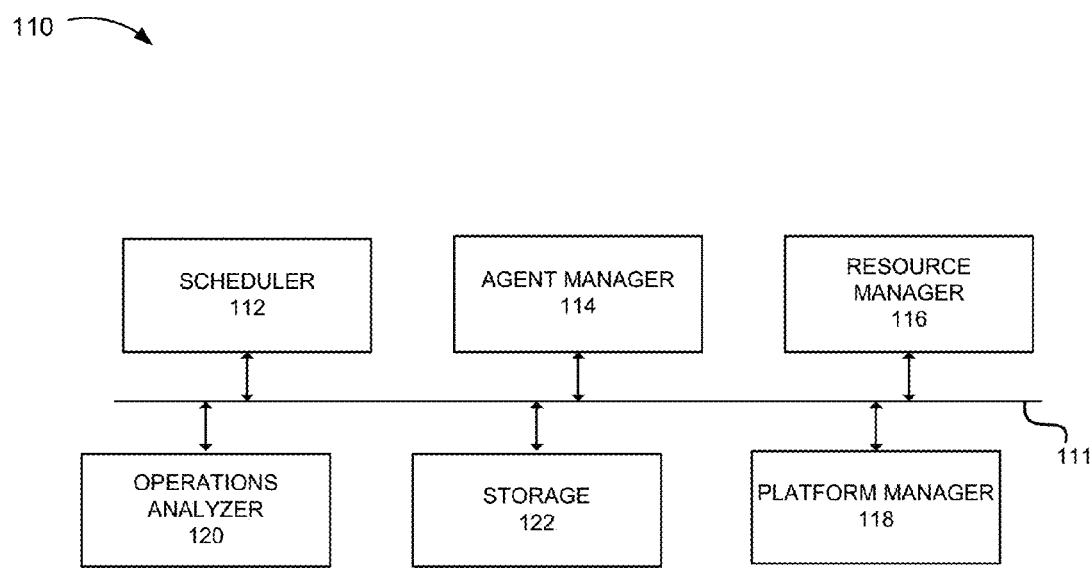
FIG. 1B is a diagram illustrating exemplary, functional components of a networked device that provides the management service.

FIG. 1B is a diagram illustrating exemplary, functional components of networked device 110. As illustrated, networked device 110 includes a scheduler 112, an agent manager 114, a resource manager 116, a platform manager 118, an operations analyzer 120, a storage 122, and a link 111. According to other embodiments, networked device 110 may include additional, fewer, and/or different components. Additionally, according to other embodiments, two or more components may be combined into one component. Additionally, or alternatively, a function or logic described as belonging to a particular component may be implemented by a different component, or a combination of components, which may or may not include the particular component of the management service. Additionally, or alternatively, a component may be implemented in a centralized architecture or a distributed architecture. The component may also reside on one or multiple networked devices 110.

Link 111 includes a path that permits communication between components of networked device 110. For example, link 111 may include a software link (e.g., an application program interface (API), etc.), a hardware link (e.g., a data bus, a system bus, a control bus), or an inter-networked device link (e.g., link 130). For example, resource manager 116 may perform reads/writes to storage 122 via link 111, etc. According to another example, operations analyzer 120 and scheduler 112 may perform inter-process communication (IPC) via link 111.

Scheduler 112 includes logic that provides the scheduling service. For example, scheduler 112 ingests job requests pertaining to processes to be executed within the networked environment. According to an exemplary implementation, scheduler 112 ingests a job request by providing an interactive user interface that allows user 175 to create a job request via user device 170. According to other exemplary implementations, scheduler 112 ingests a job request by providing an interactive user interface that allows user 175 to upload a job request via user device 170. For example, user 175 creates the job request via user device 170 and subsequently uploads the job request to scheduler 112. Scheduler 112 stores a job request in request 122.

The job request includes data and parameters pertaining to the execution of a process of an application of networked device 125 or networked device 150. According to various exemplary implementations, the application may operate within a container, not within a container, an application virtual machine, etc. According to an exemplary embodiment, the job request includes a timeslot profile. The timeslot profile includes projection parameters that indicate projected characteristics (e.g., projected loads, projected durations, etc.) of the process when the process is executed. The timeslot profile also includes timing parameters. For example, the timing parameters pertain to timing characteristics (e.g., timing adherence, timing offsets, timing associations relative to other processes, etc.) of the process when the process is executed. The job request also includes adaptive scheduling parameters pertaining to adaptive scheduling. A further description of the job request is provided below.

Scheduler 112 includes logic to generate a schedule based on the job request. According to an exemplary embodiment, scheduler 112 has a global view of the networked environment in terms of virtual entities (e.g., applications, containers, virtual machines, etc.) and physical resources (e.g., networked devices 125, networked device 150, links 130, etc.). For example, as described further below, platform manager 118 manages the virtual entities of the networked environment and stores virtual profiles that indicate the virtual landscape within the networked environment. Additionally, for example, as described further below, resource manager 116 manages the physical resources within the networked environment and stores resource profiles that indicate the physical resource landscape within the networked environment. Scheduler 112 uses the virtual profiles and the resource profiles to afford scheduler 112 the global view of the networked environment and the resource on which the networked environment operates.

Scheduler 112 includes logic to adapt a schedule based on a resource inefficiencies profile. According to an exemplary embodiment, scheduler 112 uses adaptive scheduling techniques to reduce or avoid resource inefficiencies within the networked environment based on the resource inefficiencies profile. According to an exemplary implementation, an adaptive scheduling technique is to "time-shift" the execution of one or multiple processes. For example, scheduler 112 may use a time offset to create a time-shift between two or more processes and the execution of these processes. According to another exemplary implementation, an adaptive scheduling technique is to move a process "off-node." For example, scheduler 112 may move one or more processes from one networked device 125 to another networked device 125.

According to an exemplary embodiment, scheduler 112 also uses the virtual profiles and the resource profiles to calculate an adapted schedule. For example, depending on the processes responsible for the resource inefficiencies and the time window during which the resource inefficiencies occur, scheduler 112 selects one or multiple virtual profiles pertaining to one or multiple networked devices of the networked environment (e.g., networked devices 125 and/or networked device 150), and selects one or multiple resource profiles pertaining to one or multiple networked devices and/or links of the networked environment (e.g., networked devices 125, networked device 150, links 130).

According to an exemplary embodiment, scheduler 112 uses the job request (e.g., data, parameters, etc.), which was used to generate a current schedule, to calculate an adapted schedule. For example, the job request may include data and/or parameters that govern or influence the calculation of the adapted schedule, examples of which are described.

According to one exemplary embodiment, scheduler 112 is restricted in the manner of calculating the adapted schedule based on the data and/or parameters included in the job request. For example, assume scheduler 112 determines to adapt the schedule of the process using the time-shift, adaptive scheduling technique. However, the job request associated with the process includes a time-shift restriction parameter that indicates a maximum time offset that can be used for the time-shift, adaptive scheduling. Thus, scheduler 112 is restricted to an amount of time offset that can be used to address the resource inefficiencies for that process. Alternatively, the job request associated with the process includes an off-node restriction parameter that indicates particular networked device(s) 125 for selection and use when off-node, adaptive scheduling is used. According to another example, the job request includes an adaptive scheduling restriction parameter that indicates a particular adaptive scheduling technique that is not permitted or is permitted in relation to the process. For example, when the adaptive scheduling restriction parameter indicates time-shift, adaptive scheduling, scheduler 112 is restricted to using a time-shift, adaptive scheduling technique to address the resource inefficiencies.

According to another exemplary embodiment, scheduler 112 is prohibited from calculating the adapted schedule based on the data and/or parameters included in the job request. For example, the job request includes an adaptive scheduling prohibition parameter that indicates adaptive scheduling is prohibited. Scheduler 112 determines not to adapt the schedule of a process, despite the resource inefficiencies, because the job request includes the adaptive scheduling prohibition parameter. According to an exemplary implementation, when scheduler 112 is prohibited from using adaptive scheduling, scheduler 112 generates a notification (e.g., an e-mail, etc.) to an administrator regarding this issue and/or stores a conflicts file. The conflicts file is accessible to the administrator via storage 122. The conflicts file indicates details regarding the conflict (e.g., job request and adaptive scheduling) and details regarding the resource inefficiencies that exist.

According to another exemplary embodiment, scheduler 112 is prohibited from using an adaptive scheduling technique when scheduler 112 determines that the resource inefficiencies cannot be improved. For example, there may be instances in which adaptive scheduling does not improve resource inefficiencies and/or contention issues and perhaps may even further degrade these issues. According to other examples, scheduler 112 may determine to not use adaptive scheduling for other reasons, such as to preserve process affinity, process fate-sharing, process stickiness, etc. According to an exemplary implementation, scheduler 112 generates a notification (e.g., an e-mail, a log message, etc.) to the administrator regarding this issue and/or stores a test file. The test file is accessible to the administrator via storage 122. The test file indicates details regarding candidate, adaptive scheduling calculations performed by scheduler 112 and the details regarding the resource inefficiencies stemming from such calculations (e.g., no improvement, degradation, etc.).

According to an exemplary embodiment, the administrator may manually address resource inefficiencies associated with a scheduled process, by submitting one or multiple job requests, subsequent to the first or original job request, to scheduler 112. This may occur as a result of the administrator reviewing a resource inefficiencies profile, reviewing the conflicts file stored in storage 122, and/or receiving a notification from scheduler 112.

Agent manager 114 includes logic that provides the agent management service. For example, agent manager 114 manages remote management agents of the management service, which reside on networked devices 125. Agent manager 114 can transmit a message to and receive a message from the remote management agents. According to an exemplary embodiment, agent manager 114 receives resource utilization data from the remote management agents. Agent manager 114 stores the resource utilization data in storage 122.

Resource manager 116 includes logic that stores and updates resource profiles attributed to networked devices 125 and networked device 150. For example, the resource profiles indicate memory characteristics (e.g., amount, type, read/write attributes, etc.), storage characteristics (e.g., amount, type, read/write attributes, etc.), processing characteristics (e.g., number of processors, type of processor, speed of processor, etc.), communication characteristics (e.g., number of line cards, data rates, number of ports, port identifiers, etc.), operating system characteristics (e.g., the type of operating system, the version of the operating system, etc.), communication protocols (e.g., Internet Protocol (IP), Transmission Control Protocol (TCP), etc.), etc., relative to networked devices 125 and networked device 150. The resource profiles may also indicate characteristics pertaining to links 130 between networked devices 125, networked device 150, and/or networked device 110. For example, link characteristics may indicate type of link (e.g., T1, optical, wired, wireless, etc.), the number of links, available bandwidth, speed, etc. The resource profiles are stored in storage 122. The resource profiles include identifiers for a resource (e.g., a processor, disk storage, a line card, a link, etc.), a network address of the networked device on which the resource resides, a mapping between a line card and a link, etc., to facilitate the management of the resources.

Platform manager 118 includes logic that stores and updates virtual profiles attributed to networked devices 125 and networked device 150. For example, the virtual profiles indicate application characteristics (e.g., the number of applications, the type of applications, etc.), container characteristics (e.g., the number of containers, the type of container, etc.), application-to-process-to-container characteristics (e.g., mappings between applications, processes, and containers, attributes of the applications or processes, etc.), virtual machine characteristics, hypervisors, services, etc. The virtual profiles are stored in storage 122. The virtual profiles include identifiers for a virtual entity (e.g., an application, a container, a host, a hypervisor, a virtual machine, etc.), a network address for the virtual entity, etc., to facilitate the management of and communication with the networked environment.

Platform manager 118 includes logic to facilitate the setting up and the tearing down of a process associated with a networked device. For example, when a process is moved from a networked device (e.g., networked device 125-1) to another networked device (e.g., networked device 125-X), platform manager 118 instructs control agents, which reside on networked devices 125, to perform set up and tear down procedures.

According to an exemplary embodiment, operations analyzer 120 includes logic that provides an evaluation service, as described herein. Operations analyzer 120 selects and analyzes resource utilization data or analytics data that is stored in storage 122. Operations analyzer 120 attempts to identify any resource inefficiencies that occurred based on the analysis of the resource utilization data or the analytics data. Operations analyzer 120 may include existing or conventional analytic technologies. For example, operations analyzer 120 may include a log analytics tool. By way of further example, under a Linux framework, operations analyzer 120 may include one or multiple analytics tools that are available, such as Logwatch, GoAccess, or the like. Additionally, or alternatively, the analytics tool may be proprietary and include the functionality, as described herein. Operations analyzer 120 may generate derived data based on the analysis of the resource utilization data. Operations analyzer 120 stores derived data in storage 122. During the analysis, operations analyzer 120 may perform various operations, such as for example, reading and evaluating the resource utilization data, identifying dependencies between resource utilization data (e.g., based on process identifiers), determining timing signatures of processes, calculating execution statistics, identifying instances of contention between processes, identifying resource utilization inefficiencies resulting from contentions, bottlenecks, etc., evaluating resource performance metrics, and the like.

According to an exemplary implementation, operations analyzer 120 determines whether to analyze the resource utilization data based on a historical threshold parameter. For example, the historical threshold parameter may indicate that a certain amount of historical, resource utilization data has been collected. By way of further example, an administrator may configure the historical threshold parameter to indicate a minimum amount of time (e.g., two weeks, etc.) during which resource utilization data is to be collected and/or a minimum number of resource utilization data files (e.g., ten, twenty, etc.) is to be collected. According to such an implementation, operations analyzer 120 determines to analyze the resource utilization data when the historical threshold parameter is satisfied. Conversely, operations analyzer 120 determines not to analyze the resource utilization data when the historical threshold parameter is not satisfied. In some cases, when the historical threshold parameter is implemented, a more accurate representation of the operational status within the networked environment may be obtained. For example, a more accurate representation of instances of contention or bottleneck, may be obtained when present, and resource performance within the networked environment for carrying out the job requests may be obtained.

According to an exemplary implementation, operations analyzer 120 invokes the historical threshold parameter when a change occurs within the networked environment. For example, the change may correspond to a new process, a new application, a new container, a new virtual machine, etc., being added to a networked device (e.g., networked device 125, networked device 150) or a new link (e.g., link 130) being added. According to another example, the change may correspond to an existing process, an existing application, an existing virtual machine, an existing container, etc., being removed from a networked device or a existing link is torn down. When the historical threshold parameter is used, operations analyzer 120 analyzes multiple resource utilization data files that are collected and stored. Operations analyzer 120 may use well-known techniques (e.g., averaging, etc.) to compile the resource utilization data. During the analysis, operations analyzer 120 may generate derived data files based on the resource utilization data files and compile the derived data files using well-known techniques. According to other implementations, operations analyzer 120 may not use the historical threshold parameter for determining whether to analyze resource utilization data.

According to an exemplary embodiment, operations analyzer 120 compares resource utilization data or analytics data to operational threshold values. As previously described, an operational threshold value may include a single parameter value (e.g., x value), multiple parameter values (e.g., x value, y value, z value, etc.) or a range of values (e.g., between x and y values). The operational threshold value may be applicable to a system-wide perspective of the networked environment (e.g., a global, operational threshold value) or a portion thereof (e.g., per node, per grouping of nodes, etc.) (e.g., a non-global, operational threshold value). The administrator may configure the type of operational threshold parameters to be used for comparison and their corresponding values. The administrator may configure the operational threshold values in a manner that represents a desired operational state and desired efficiency within the networked environment. The operational threshold values may include parameter values directed to, for example, resource utilization, resource performance, and/or execution statistics.

Operations analyzer 120 determines whether to generate a resource inefficiency profile based on a result of the comparison. For example, when operations analyzer 120 determines that the resource utilization data or the analytics data satisfies the operational threshold values, operations analyzer 120 determines not to generate the resource inefficiency profile. Alternatively, when operations analyzer 120 determines that the resource utilization data or the analytics data does not satisfy the operational threshold values, operations analyzer 120 determines to generate the resource inefficiency profile.

According to an exemplary embodiment, when operations analyzer 120 determines to generate the resource inefficiency profile, operations analyzer 120 determines whether to provide the resource inefficiency profile to scheduler 112. According to an exemplary embodiment, operations analyzer 120 uses difference values relative to the operational threshold values to make such a determination. By way of example, the difference in values between resource utilization data values, derived data values, or analytics data, and the operational threshold values may be indicated as difference values. The difference value may indicate a degree or amount of inefficiency. When the difference value is above a certain difference threshold value, operations analyzer 120 determines to notify or provide the resource inefficiency profile to scheduler 112 and store the resource inefficiency profile. Alternatively, when the difference value is below the difference threshold value, operations analyzer 120 determines not to notify or provide the resource inefficiency profile to scheduler 112, and simply stores the resource inefficiency profile. The administrator may access and review the resource inefficiency profile that is stored.

According to other exemplary embodiments, when operations analyzer 120 determines to generate the resource inefficiency profile, operations analyzer 120 determines to provide the resource inefficiency profile to scheduler 112. That is, when operations analyzer 120 determines that the resource utilization data or the analytics data does not satisfy the operational threshold values, operations analyzer 120 determines to provide the resource inefficiency profile to scheduler 112. According to such an embodiment, the administrator may configure the operational threshold values and the comparison process in a manner that when the operational threshold values are not satisfied, a minimal level of inefficiency exists such that the adaptive scheduling service is to be invoked.

According to an exemplary embodiment, operations analyzer 120 generates a resource inefficiency profile based on a result of the comparison between the resource utilization data or the analytics data, and the operational threshold values. The resource inefficiency profile includes data indicating a resource that is inefficiently used, a time period during which the resource is inefficiently used, and a virtual entity that contributes to the resource inefficiency. For example, the resource inefficiency profile may indicate that a memory is over-utilized during a time period based on a process 1 associated with an application and container on networked device 125 and a process 2 associated with another application and container on networked device 125. Operations analyzer 120 stores the resource inefficiency profile in storage 122.

Storage 122 is a device that provides storage for the management service. Storage 122 may be used to store databases, profiles, etc, by various components of the management service. For example, storage 122 stores resource inefficiency profiles, resource utilization data files, job requests, resource profiles, virtual profiles, schedules, derived data, and/or other data that may be used to provide the management service.

Figure 1C:
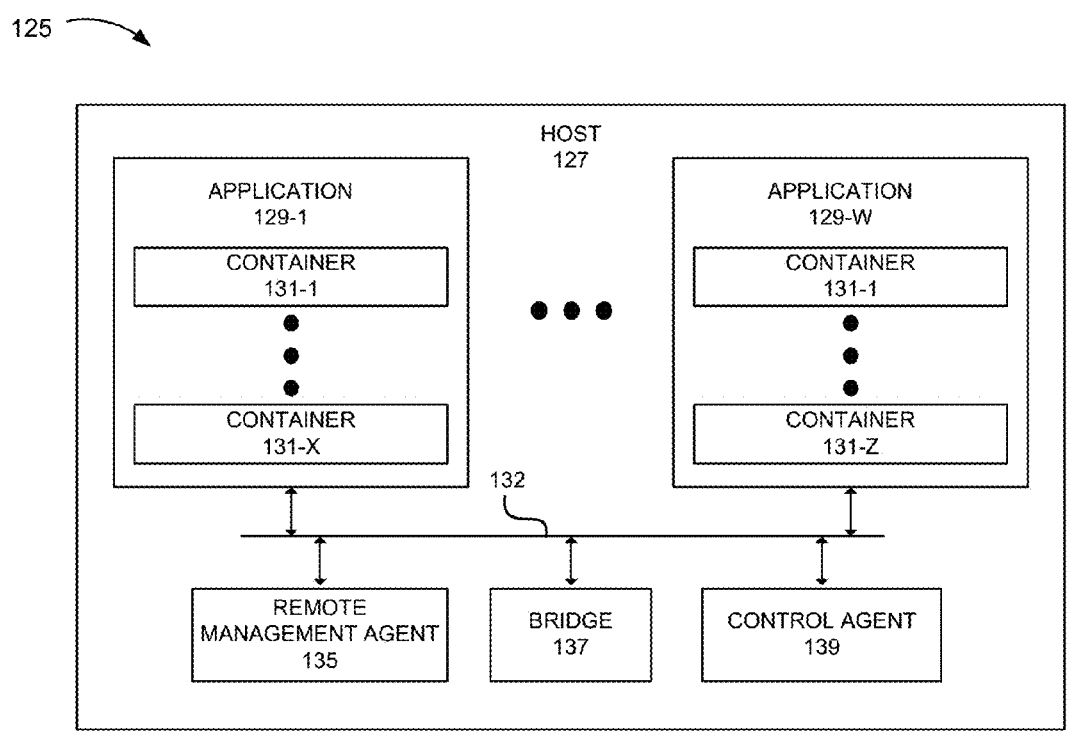
FIG. 1C is a diagram illustrating exemplary, functional components of a networked device of a containerized virtual entity.

FIG. 1C is a diagram illustrating exemplary, functional components of networked device 125. As illustrated, networked device 125 includes a host 127, applications 129-1 through 129-W, in which W>1 (also referred to collectively as applications 129 and, individually and/or generically as application 129), containers 131-1 through 131-X, in which X>1 and Z>1 (also referred to collectively as containers 131 and, individually and/or generically as container 131). The number of applications 129 and the number of containers 131 are exemplary. Networked device 125 further includes a remote management agent 135, a bridge 137, a control agent 139, and a link 132.

According to other embodiments, networked device 125 may include additional, fewer, and/or different components. For example, networked device 125 may not include containers 131. Additionally, according to other embodiments, two or more components may be combined into one component. Additionally, or alternatively, a function or logic described as belonging to a particular component may be implemented by a different component, or a combination of components, which may or may not include the particular component of the management service.

Link 111 includes a path that permits communication between components of networked device 125. For example, link 111 may include a software link (e.g., an API, etc.) and/or a physical or hardware link (e.g., a data bus, a system bus, a control bus, bus drivers, bus arbiters, bus interfaces, and/or clocks). For example, remote management agent 135 may transmit a message to and receive a message from networked device 110 via link 111 and bridge 137. According to another example, control agent 139 and application 129 may perform inter-process communication (IPC) via link 132. Host 127 is the physical machine where a virtual environment operates.

Application 129 is a software application. According to an exemplary implementation, application 129 may be a network application. For example, the network application may pertain to routing, storing (i.e., storage of data), security, controlling another networked device, or other functionality associated within a network, a data center, a cloud, a cluster, a virtualized environment, etc. According to another exemplary implementation, application 129 may be an end user application. For example, the end user application may pertain to a user service or a web service, or be an enterprise application, a business-related application, a customer application, etc. According to an exemplary implementation, application 129 is a Linux application. According to another exemplary implementation, application 129 is not a Linux application. Application 129 may be a long-lived application or a short-lived application. A long-lived application may be deterministic or non-deterministic. A short-lived application may be a one-time, event-based (triggered), or has periodic lifetimes.

Container 131 is an element of a container-based virtualization. For example, container 131 may be considered an application container (e.g., in user space) and/or an OS container. Each container 131 may provide containment for one or more processes associated with application 129. A process (e.g., an operation, a task, etc.) may be deterministic or non-deterministic. Containers 131 may share the same hooks into the kernel of the operating system (e.g., Linux, etc.).

Remote management agent 135 includes logic that provides a resource monitoring service. For example, remote management agent 135 monitors the resource utilization that occurs on networked device 125 over time. Additionally, for example, remote management agent 135 includes logic to monitor resource utilization associated with the connections between networked devices 125, connections between networked devices 125 and networked device 150, etc. For example, remote management 135 may monitor the amount of traffic, frequency of transmission, frequency of reception, and other types of characteristics pertaining to communication between the networked devices of network 105. Based on the monitoring, remote management agent 135 generates a resource utilization data that represents the utilization of resources that occur when processes are executed within host 127, within container 131, etc., on networked device 125. Depending on the process executed, the resource utilization data may include data pertaining to the utilization of connection resources between the networked devices of network 105.

Remote management agent 135 may use an existing or conventional resource monitoring technology to perform these tasks. For example, remote management agent 135 may be implemented with a monitoring tool. By way of further example, under a Linux framework, remote management agent 135 may use one or multiple monitoring tools (e.g., a system monitoring tool, a network monitoring tool, etc.) that are available, such as atop, ntopng, Linux processor explorer, or the like. Alternatively, the monitoring tool may be proprietary and includes the functionality, as described herein. According to an exemplary implementation, remote management agent 135 may be configured to have dedicated hardware (e.g., memory, processor, etc.). In this way, the resource monitoring service does not negatively impact the resource usage of containerized processes of application 129 on networked device 125. According to other exemplary implementations, remote management agent 135 may share the resources of networked device 125 with the containerized processes to be executed. According to such implementations, the monitoring sampling rate may be adjusted to minimize the number of calls to the operating system to write to a log file, etc.

Remote management agent 135 transmits the resource utilization profile to networked device 110 via bridge 137. For example, remote management agent 135 transmits the resource utilization profile to agent manager 114 or operations analyzer 120 of networked device 110.

Bridge 137 includes logic that routes and/or forwards traffic. For example, bridge 137 manages communication between different containers 131 resident on a same networked device 125 and between different containers 131 resident on different networked devices 125. Additionally, for example, bridge 137 manages communication between networked device 125 and networked device 150, or between networked device 125 and networked device 110. Additionally, for example, bridge 137 manages communication between networked device 125 and a networked device (not illustrated) that is outside of network 105.

Control agent 139 provides an orchestration and execution service, as described herein. For example, control agent 139 receives a job request from scheduler 112 and coordinates the execution of processes of application 129/container 131 based on the parameters of the job request and the available timeslots. According to an exemplary implementation, control agent 139 registers for the subscription service to obtain publications (e.g., schedules, adapted schedules, etc.). According to other exemplary implementations, application 129 or application 129/container 131 may be registered with the subscription service.

FIGS. 2A-2H are diagrams illustrating an exemplary embodiment of the management service in relation to an exemplary scenario. According to this scenario, the networked environment includes a virtual, container-based environment. However, according to other scenarios, the management service may be directed to other types of networked environments that do not include a virtual, container-based environment. The number of virtual entities (e.g., applications 129, containers 131, etc.), the number of networked devices 125, transmission and/or reception of data between virtual entities and/or networked devices, etc., are exemplary.

Figure 2A:
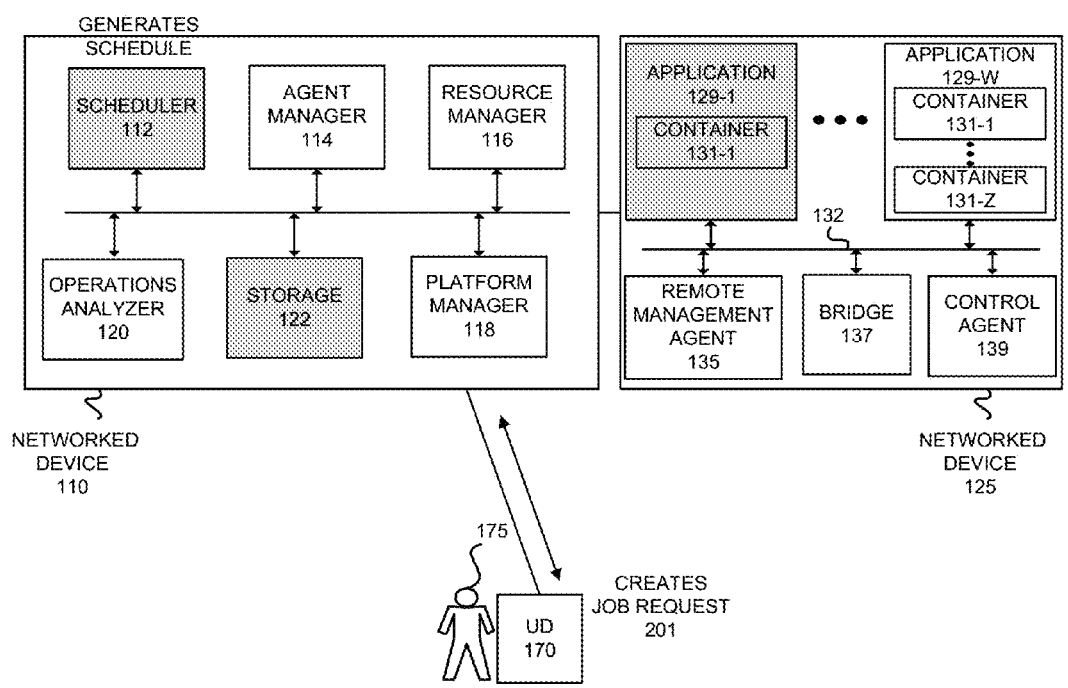
FIGS. 2A-2H are diagrams illustrating an exemplary scenario in which an exemplary embodiment of the management service may be implemented.

Referring to FIG. 2A, assume user 175 wishes to create a job request for application 129-1 and container 131-1 for networked device 125. For example, application 129-1 and container 131-1 may be a recently installed application. According to an exemplary implementation, user 175 creates a job request 201 via user device 170. For example, user device 170 may have administrative software that provides a graphical user interface that allows user 175 to create job request 201. Alternatively, according to another exemplary implementation, networked device 110 may include administrative software that provides a graphical user interface that allows user 175 to create job request 201 via user device 170. By way of example, scheduler 112 may provide an interactive user interface that allows user 175 to create job request 201.

According to an exemplary embodiment, the job request includes service description data. For example, the service description data includes an identifier that uniquely identifies networked device 125 as the networked device on which application 129-1 and container 131-1 reside. The service description data may include other service description parameters. For example, the service description data may indicate whether a process of application 129-1 and container 131-1 is long-lived or short-lived, and whether the process includes transmission and/or reception of data between networked device 125 and another networked device 125.

According to an exemplary embodiment, the job request includes a timeslot profile. According to an exemplary implementation, the timeslot profile includes one or multiple projection parameters. For example, the projection parameters indicate a projected, steady state duration and a projected, burst duration during the execution of application 129-1 and container 131-1. The projected parameters also indicate projected load characteristics. For example, the projection parameters indicate a projected, steady state load and a projected, burst load. By way of further example, according to this scenario, the projected load characteristics pertain to hardware loads (e.g., processor load, memory load, network interface load, etc.) directed to the resources of networked device 125.

According to an exemplary embodiment, the job request includes one or multiple timing parameters. For example, the timing parameter includes an absolute timing parameter that indicates a time instance during which a job would occur. For example, the absolute timing parameter may indicate a value of every five minutes, such that the scheduling of a process executed by application 129-1 and container 131-1 should be as close as possible to the every five minutes timeline. According to another example, the timing parameter includes a maximum offset parameter that indicates a maximum time offset between processes. For example, the maximum offset parameter may indicate a value of three minutes to indicate a maximum timing offset between the execution of a process 1 and the execution of a process 2. According to yet another example, the timing parameter includes a minimum offset parameter that indicates a minimum time offset between processes. For example, the minimum offset parameter may indicate a value of 1 minute to indicate a minimum timing offset between the execution of a process 1 and the execution of a process 3. According to still another example, the timing parameter includes a time affinity parameter. The time affinity parameter indicates to associate particular processes and schedule the processes in accordance with like optimizations and/or assignments or unlike optimizations and/or assignments. Other examples of timing parameters include parameters pertaining to process affinity and process fate-sharing.

According to an exemplary embodiment, the job request includes one or multiple adaptive scheduling parameters pertaining to adaptive scheduling. For example, as previously described, the adaptive scheduling parameters may include various types of restriction parameters and/or prohibition parameters. Additionally, for example, the adaptive scheduling parameter may include a frequency of adaptation parameter that indicates how often a process can tolerate an adaptation.

According to this exemplary scenario, assume that user 175 interactively creates job request 201 via administrative software of scheduler 112. During the job creation process, scheduler 112 may prompt user 175 for a value, indicate when a parameter value is out-of-bounds, recommend an alternate value, present available parameters for selection and configuration, etc.

Upon completion of the job creation process, scheduler 112 generates a schedule for job request 201. For example, scheduler 112 selects particular virtual profiles and resource profiles in view of information provided in job request 201. Scheduler 112 also selects candidate time windows that would fulfill the requirements of job request 201 in view of existing schedules pertaining to other job requests and the resource utilizations associated therewith. Scheduler 112 may include code or a program that calculates an optimal time slot for job request 201 based on an optimization algorithm. Scheduler 112 selects and stores a schedule for job request 201 in storage 122. According to an exemplary implementation, scheduler 112 stores a job queue that indicates the queuing of processes to be executed within the networked environment.

Figure 2B:
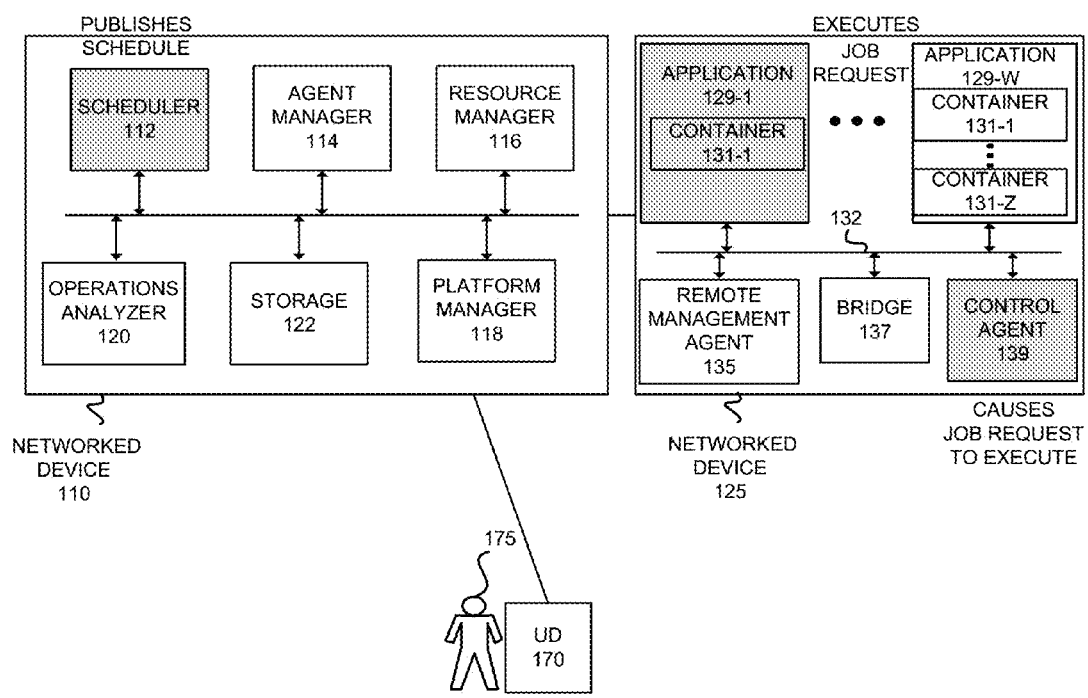

Referring to FIG. 2B, scheduler 112 publishes the schedule via a publication service. For example, the management service includes a subscription and publication service, in which scheduler 112 provides a publication service and control agent 139 subscribes to the subscription service. Control agent 139 may be notified of the publication and/or periodically poll a services repository. Alternatively, for example, application/container 129/131 may subscribe to the subscription service. According to this example, control agent 139 obtains the schedule via the publication service. The orchestration service of control agent 139 places job request 201 in a local job queue based on the schedule. Thereafter, when the scheduled time occurs, an execution service of control agent 139 causes application 129-1 and container 131-1 to execute.

Figure 2C:
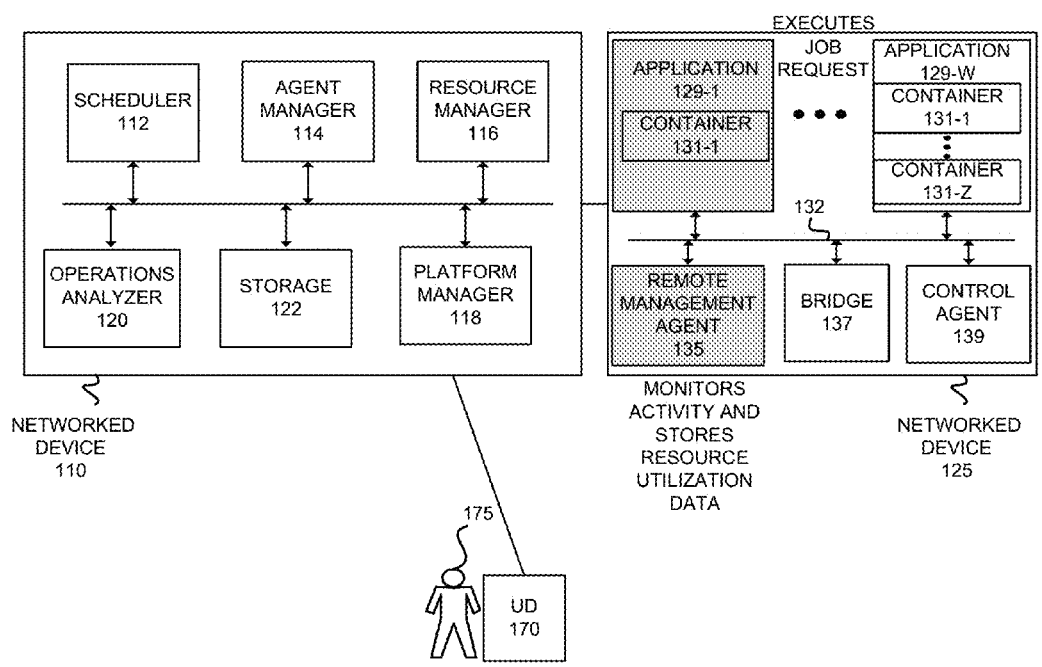

Referring to FIG. 2C, remote management agent 135 is continuously monitoring the resource utilization. Remote management agent 135 generates resource utilization data that indicates the resource utilization of networked device 125. The resource utilization data may also indicate the resource utilization of other elements (e.g., link 130, etc.). For example, remote management agent 135 may also monitor outbound and inbound traffic that arrive via bridge 137. The resource utilization data also maps a process, container 131, and/or application 129 to the resources. For example, unique identifiers of a process, container 131, and/or application 129 may be used. The resource utilization data also indicates resource usage pertaining to various resources (e.g., processor, memory, etc.). Additionally, the resource utilization data includes timestamps to indicate a time window that pertains to the resource utilization data. For example, the resource utilization data may include a beginning timestamp (e.g., 08/10/2015—01:15:30 p.m.) and an ending timestamp (e.g., 08/10/2015—07:15:30 p.m.).

Figure 4A:
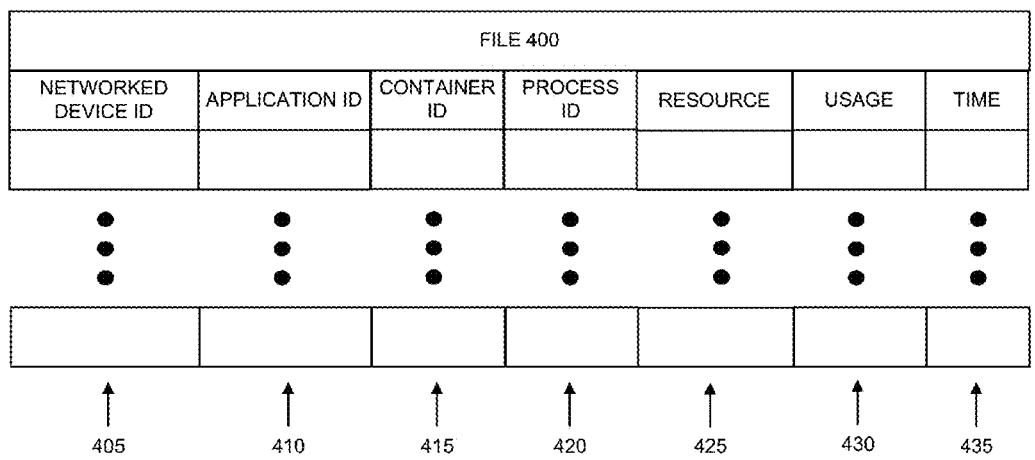
FIG. 4A is a diagram of an exemplary file that stores exemplary resource utilization data pertaining to a networked device.

Remote management agent 135 stores the resource utilization data. According to an exemplary implementation, remote management agent 135 stores a log file or a database that includes event data. The event data describes a stream of events that occur from the execution of processes and any activity of networked device 125 and the resources used. For example, the log file or the database includes a mapping between objects (e.g., application, container, host, process, etc.) and resource utilization. By way of further example, referring to FIG. 4A, remote management agent 135 may store an exemplary file 400. As illustrated, file 400 includes a networked device identifier object 405, an application identifier object 410, a container identifier object 415, a process identifier object 420, a resource object 425, a usage object 430, and a time object 435. By way of example, networked device identifier object 405 is data that uniquely identifies the networked device (e.g., networked device 125, etc.), application identifier object 410 is data that uniquely identifies an application (e.g., application 129), container identifier object 415 is data that uniquely identifies a container (e.g., container 131), and process identifier object 420 is data that uniquely identifies a process. Additionally, for example, resource object 425 is data that indicates a particular resource. For example, the resource may be a processor, memory, storage, communication interface, a line card, etc. Usage object 430 is data that indicates a load or a usage of the resource. Time object 435 is data indicating a date and a time.

Figure 4B:
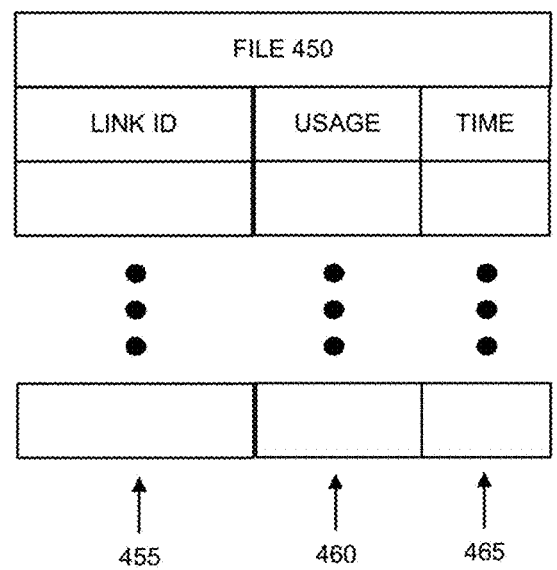
FIG. 4B is a diagram of another exemplary file that stores exemplary resource utilization data pertaining to a networked device.

As previously described, the resources may also include links 130. Remote management agent 135 may store a log file or a database that includes event data pertaining to this resource. For example, referring to FIG. 4B, remote management agent 135 may store an exemplary file 450. As illustrated, file 450 includes a link identifier object 455, a usage object 460, and a time object 465. By way of example, link identifier object 455 is data that uniquely identifies a link (e.g., link 130). Usage object 460 is data that indicates a load or a usage of the link (e.g., link 130). For example, the data may indicate bandwidth utilization, number of packets, byte counts, ports, network address (e.g., IP address, etc.), interface statistics, and the like. Time object 465 is data indicating a date and a time.

According to other implementations, the log file or database may store different types of event data. For example, file 400 and/or file 450 may include a job identifier object that uniquely identifies the job request from which the process stems. Additionally, for example, the system monitoring tool and the network monitoring tool may output and store data in a file according to a user-configurable or a pre-configured format; include additional, different, or fewer objects or instances of data; etc., than that illustrated in FIGS. 4A and 4B and described herein.

Figure 2D:
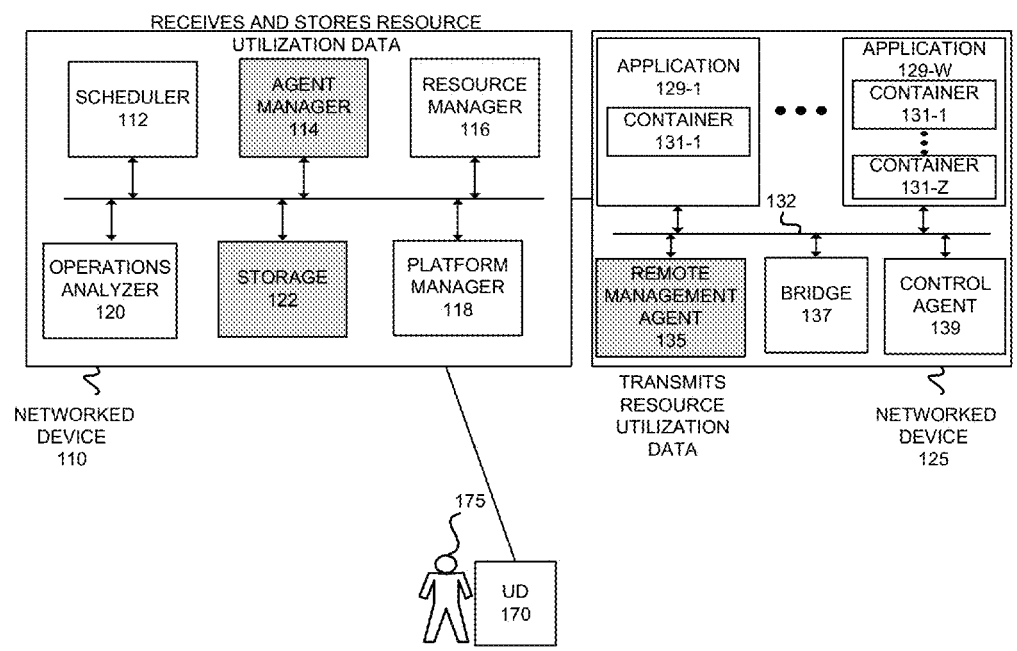
Figure 4D:
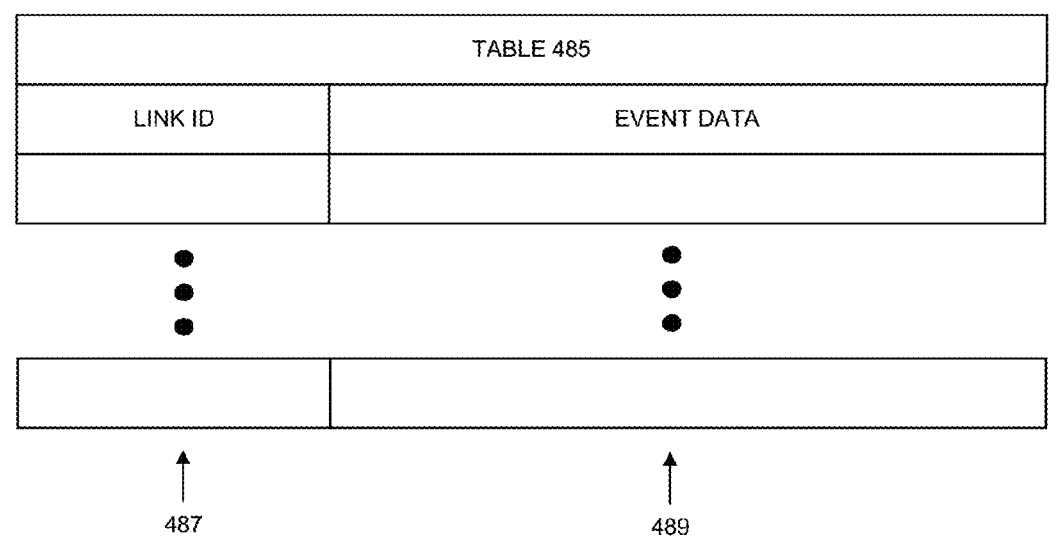

Referring to FIG. 2D, resource management agent 135 transmits the resource utilization data to networked device 110. For example, resource management agent 135 transmits the resource utilization data to agent manager 114. Agent manager 114 stores the resource utilization data in storage 122. By way of further example, referring to FIG. 4C, agent manager 114 may store the resource utilization data in an exemplary database. By way of further example, as illustrated, an exemplary table 475 includes a networked device identifier field 477 and an event data field 479. Networked device identifier field 477 stores data that uniquely identifies a networked device (e.g., networked device 125, networked device 150, or other type of networked device (not illustrated) of network 105. Event data field 479 stores data included in file 400. Depending on the processes that occur within a monitoring period and whether transmission and/or reception of data occurs between networked devices of network 105 or between a networked device of network 105 and another networked device outside of network 105, agent manager 114 may store a table similar to table 475 in storage 122. For example, referring to FIG. 4D, a table 485 includes a link identifier field 487 and an event data field 489. Link identifier field 487 stores data that uniquely identifies a link (e.g., link 130 or a link that connects a networked device of network 105 to a network or networked device outside of network 105). Event data field 489 includes data included in file 450.

Figure 2E:
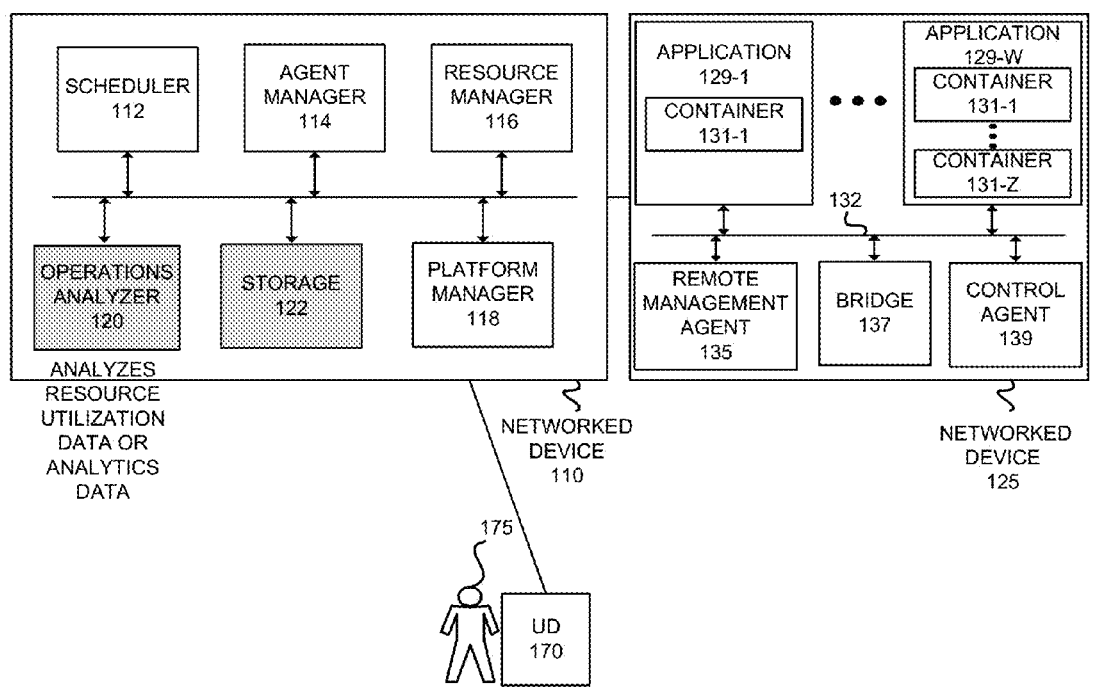

Referring to FIG. 2E, according to various implementations, as previously described, operations analyzer 120 may or may not use the historical threshold parameter. When the historical threshold parameter is used, operations analyzer 120 determines whether to analyze the resource utilization data based on a historical threshold parameter. For example, assume that job request 201 pertains to a long-lived application in which the process will be executed continuously over time according to a schedule. Remote management agent 135 will continually generate resource utilization data files that include a record of the time period during which the process is executed. The resource utilization data files are stored in storage 122 and accessible to operations analyzer 120. Operations analyzer 120 may analyze the resource utilization data or the analytics data, or forego analysis until the historical threshold parameter is satisfied. For example, operations analyzer 120 may query storage 122 to determine the schedule associated with job request 201 and calculate a time when the analysis and generation of the resource inefficiency profile is permissible in view of the historical threshold parameter value.

According to this example, assume that operations analyzer 120 does not use the historical threshold parameter. Operations analyzer 120 selects and analyzes the resource utilization data or the analytics data stored in storage 122. According to some exemplary embodiments, operations analyzer 120 generates derived data based on the analysis of the resource utilization data. During the analysis, operations analyzer 120 may perform various operations, such as for example: reading and evaluating the resource utilization data; identifying dependencies between resource utilization data files (e.g., based on process identifiers); calculating execution statistics (e.g., process execution durations, wait times for resources, response times, network latency, network round trip, resource utilization levels, rates at which swapping memory to and from disk, queue levels, etc.); identifying instances of contention between processes (e.g., commands being aborted, etc.); identifying resource inefficiencies resulting from contentions, bottlenecks, etc.; evaluating resource performance metrics; and the like.

Figure 2F:
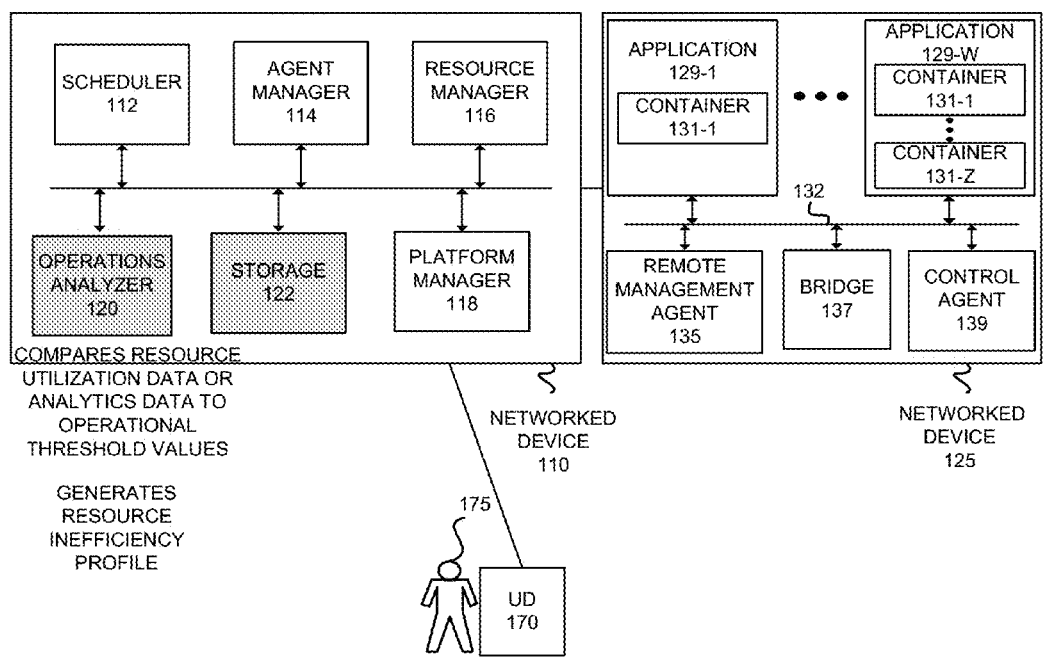

Referring to FIG. 2F, operations analyzer 120 compares the parameter values included in the resource utilization data or the analytics data to the operational threshold values. As a result of the comparison, operations analyzer 120 determines whether to generate a resource inefficiency profile. For example, when the parameter values included in the resource utilization data or the analytics data satisfy the operational threshold values, operations analyzer 120 determines not to generate the resource inefficiency profile. Additionally, when the parameter values included in the resource utilization data or the analytics data do not satisfy the operational threshold values, operations analyzer 120 determines to generate the resource inefficiency profile.

The resource inefficiency profile includes data indicating a resource that is inefficiently used, a time period during which the resource is inefficiently used, and a virtual entity that contributes to the resource inefficiency. By way of further example, the resource inefficiency profile may indicate that a processor and a memory of networked device 125 are over-utilized during multiple time periods, and may also indicate the virtual entities that contribute to the over-utilization. The resource inefficiency profile may include the results of the comparison between the resource utilization data or the analytics data to the operational threshold values. Operations analyzer 120 stores the resource inefficiency profile in storage 122.

As previously described, according to some exemplary embodiments, operations analyzer 120 uses difference values relative to the operational threshold values to determine whether to notify or provide the resource inefficiencies profile to scheduler 112. According to other exemplary embodiments, operations analyzer 120 notifies or provides the resource inefficiency profile to scheduler 112 when the parameter values included in the resource utilization data or the analytics data do not satisfy the operational threshold values. According to an exemplary implementation, when the difference threshold values and the difference values are used, the resource inefficiency profile includes this data.

Figure 2G:
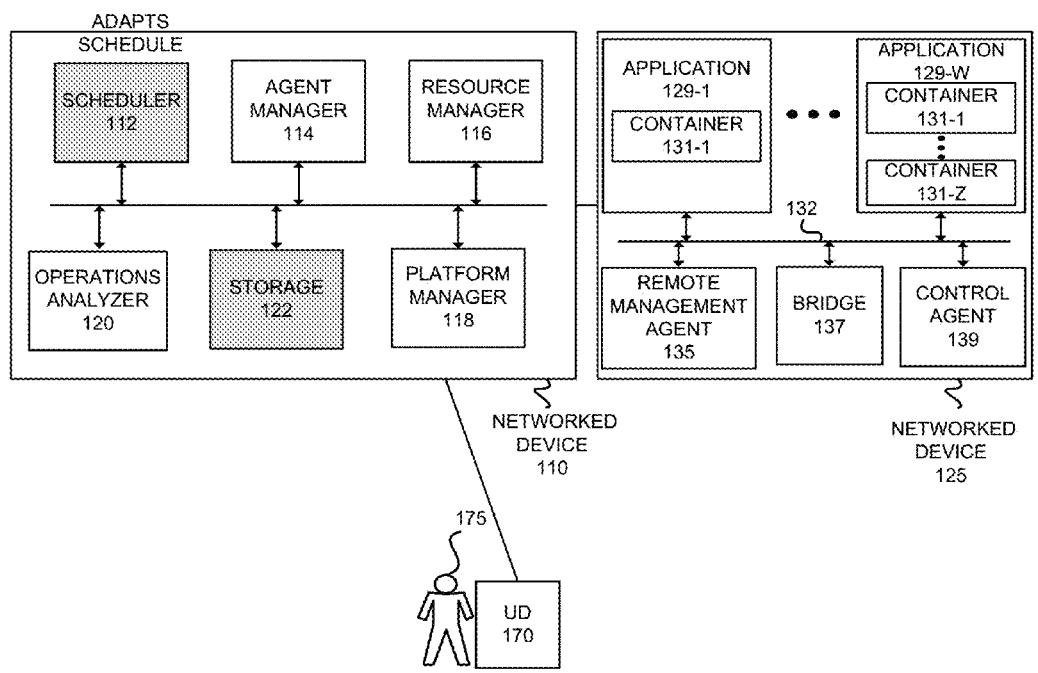

According to this exemplary scenario, assume that operations analyzer 120 determines to notify or provide scheduler 112 with the resource inefficiency profile. Referring to FIG. 2G, as previously described, according to an exemplary embodiment, scheduler 112 provides an adaptive scheduling service. The adaptive scheduling service may address certain resource inefficiencies stemming from resource contentions among processes in a networked environment. In some cases, the resource inefficiencies may stem from the job request (e.g., job request 201). By way of example, a projection parameter value included in the job request may be inaccurate. Additionally, or alternatively, a resource profile may not accurately represent resource performance. Nevertheless, regardless of the underlying reasons, since scheduler 112 generates the schedule for a process based on various types of data, the scheduling of the process may result in resource inefficiencies, contentions, bottlenecks, etc., occurring within the networked environment.

In contrast to other existing schedulers of a virtualized environment, scheduler 112 includes the adaptive scheduling service that affords a feedback mechanism for scheduling. As described herein, resource inefficiencies are further examined and possibly reduced or eliminated in view of historical resource utilization data analysis and adaptive scheduling techniques. According to an exemplary implementation, the adaptive scheduling technique includes a time-shifting-based adaptation. According to another exemplary implementation, the adaptive scheduling technique includes an off-node adaptation. Scheduler 112 may also consider adaptive scheduling parameters, which may be included in a job request, when performing the adaptive scheduling service. For example, as previously described, the adaptive scheduling parameters may include restriction parameters and/or prohibition parameters.

Figure 5A:
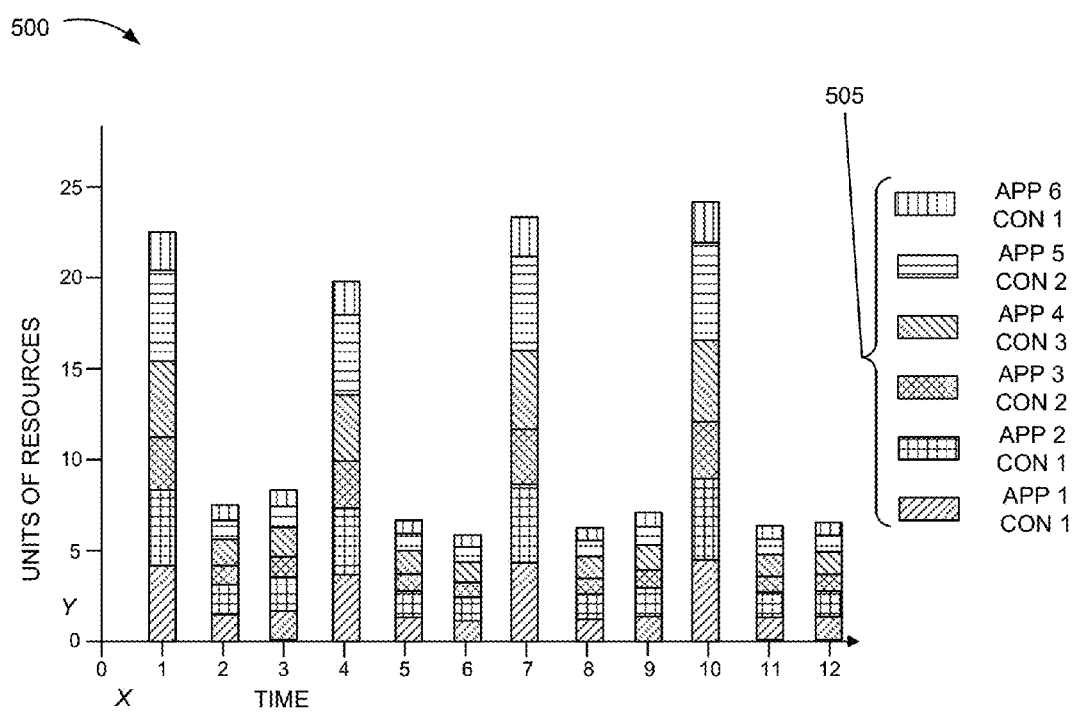
FIG. 5A is a diagram illustrating an exemplary resource inefficiency profile.

FIG. 5A is a diagram that (graphically) illustrates an exemplary resource inefficiency profile. As illustrated, the x axis represents time and the y axis represents units of resources. The units of resource may pertain to a specific or single resource (e.g., a processor, etc.) or a multiple resources (e.g., memory and processor usage, etc.). As also illustrated, a key system 505 represents various processes (e.g. application 1, container 4; application 2 container 1, etc.) that executed on networked device 125 during a particular time frame. As further illustrated, during time instances one (1), four (4), seven (7), and ten (10), there are large levels (e.g., spikes) of resource utilization. Additionally, during time instances two (2), three (3), five (5), six (6), eight (8), nine (9), eleven (11), and twelve (12), there are low levels (e.g., drops) of resource utilization.

According to this scenario, assume that job requests pertaining to the processes involved (e.g. application 1, container 4; application 2 container 1, etc.) do not include any restrictive and prohibitive adaptive scheduling parameters. Additionally, according to this scenario, assume scheduler 112 selects time-shift, adaptive scheduling to attempt to reduce or eliminate the resource inefficiencies. According to one exemplary implementation, when the job requests do not include any restrictive, adaptive scheduling parameters and prohibitive, adaptive scheduling parameters, scheduler 112 selects an order in which adaptive scheduling techniques are tested based on an administrative preference parameter. Alternatively, scheduler 112 may simultaneously perform calculations pertaining to different adaptive scheduling techniques.

Figure 5B:
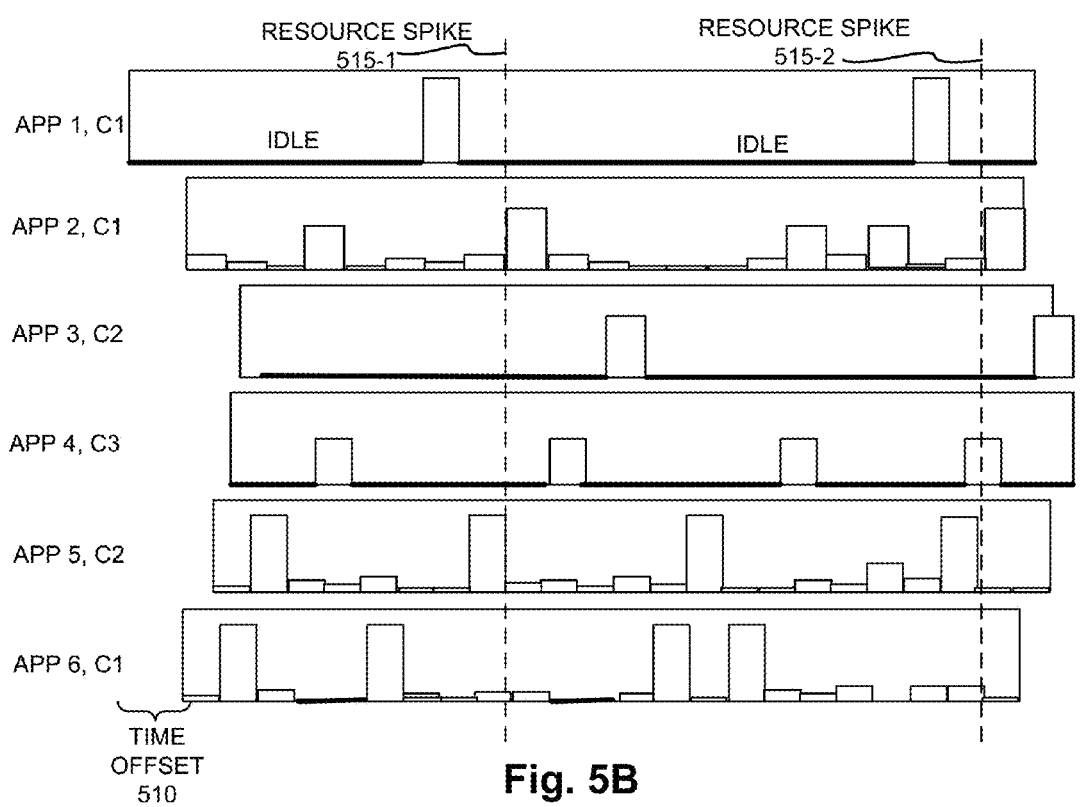
FIG. 5B is a diagram illustrating an exemplary adaptive scheduling technique.
Figure 5C:
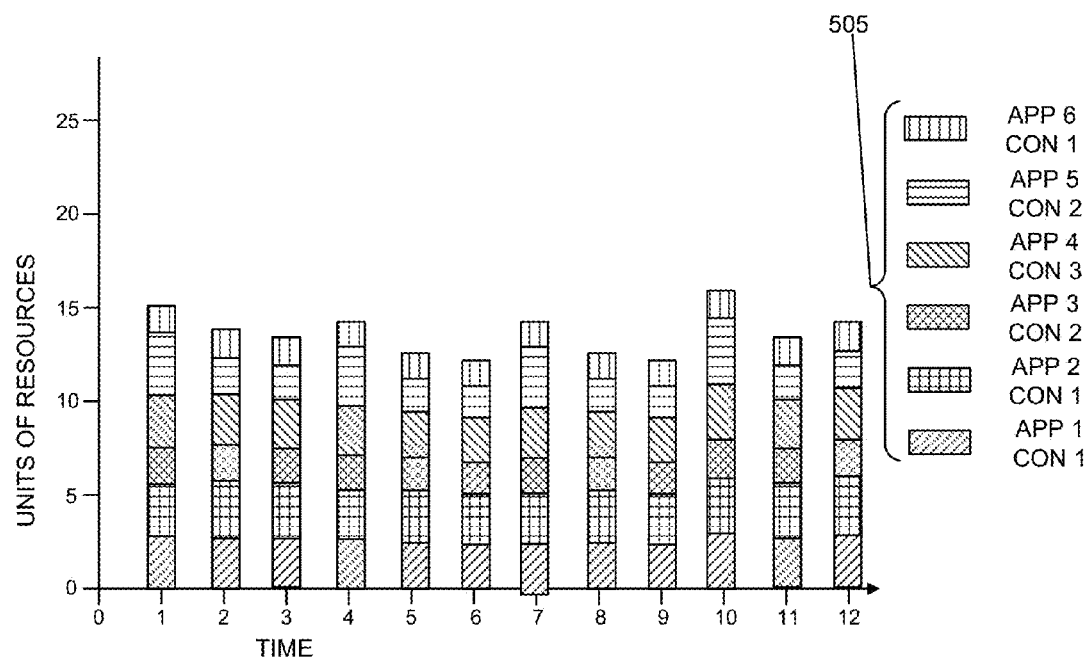
FIG. 5C is a diagram illustrating an exemplary resource utilization profile subsequent to adaptive scheduling.

According to this example, scheduler 112 selects virtual profiles pertaining to the processes involved and selects a resource profile pertaining to networked device 125. Based on the resource inefficiency profile, the virtual profiles, the resource profile, and the job requests, scheduler 112 invokes the optimizing algorithm that calculates an adapted schedule. Referring to FIG. 5B, in accordance with time-shift, adaptive scheduling, scheduler 112 calculates a time offset 510 relative to the existing schedule that governs the concurrent execution of the processes. As (graphically) illustrated in FIG. 5B, resource spikes 515-1 and 515-2 (also referred to collectively as resource spikes 515 and, individually and/or generically as resource spike 515), which correspond to time instances (e.g., one (1), four (4), etc. of FIG. 5A), are identified in the timeline of the resource inefficiency profile. In view of the resource inefficiency profile, in addition to the other data (e.g., virtual profile, etc.), scheduler 112 calculates time offset 510 that will cause a staggering of prospective execution of the processes under examination in a manner that may reduce or eliminate the hill-and-valley resource utilization represented in FIG. 5A. For example, referring to FIG. 5C, scheduler 112 calculates an adapted schedule that yields more uniform resource utilization among the processes while the processes are concurrently executed. Scheduler 112 determines a future time instance that corresponds to the time instance (e.g., one (1), four (4), etc. of FIG. 5A) in which resource spike 515 occurred, and calculates time offset 510 relative to that future time instance. For example, scheduler 112 may identify execution signature patterns pertaining to the process under examination based on an analysis of the available data (e.g., the resource inefficiency profile, etc.). Scheduler 112 may determine the future time instance based on such an analysis.

Referring back to FIG. 2G, scheduler 112 generates an adapted schedule. Thereafter, scheduler 112 publishes the adapted schedule, etc., as previously described. In this way, according to an exemplary embodiment, the management system provides a scheduling-based feedback loop that may reduce or eliminate resource inefficiencies in a containerized, virtual environment. The published, adapted schedule may be obtained by control agent 139 via the subscription service, as previously described. Alternatively, for example, an application/container may subscribe to the subscription service.

The adaptive scheduling service may be result-driven in that scheduler 112 may attempt to use all available adaptive scheduling techniques or some of them to address resource inefficiency profiles. Based on the results of each adaptive scheduling technique, scheduler 112 may determine which of the multiple, candidate adapted schedules yields the best, prospective result. According to some scenarios, scheduler 112 may use a combination of adaptive scheduling techniques. For example, scheduler 112 may use off-node adaptive scheduling in combination with time-shift, adaptive scheduling to address resource inefficiency issues. Scheduler 112 may calculate multiple iterations of an adaptive scheduling technique so that multiple, candidate solutions are available from which to select for addressing the resource inefficiency. For example, scheduler 112 may calculate multiple and different time offsets.

Figure 2H:
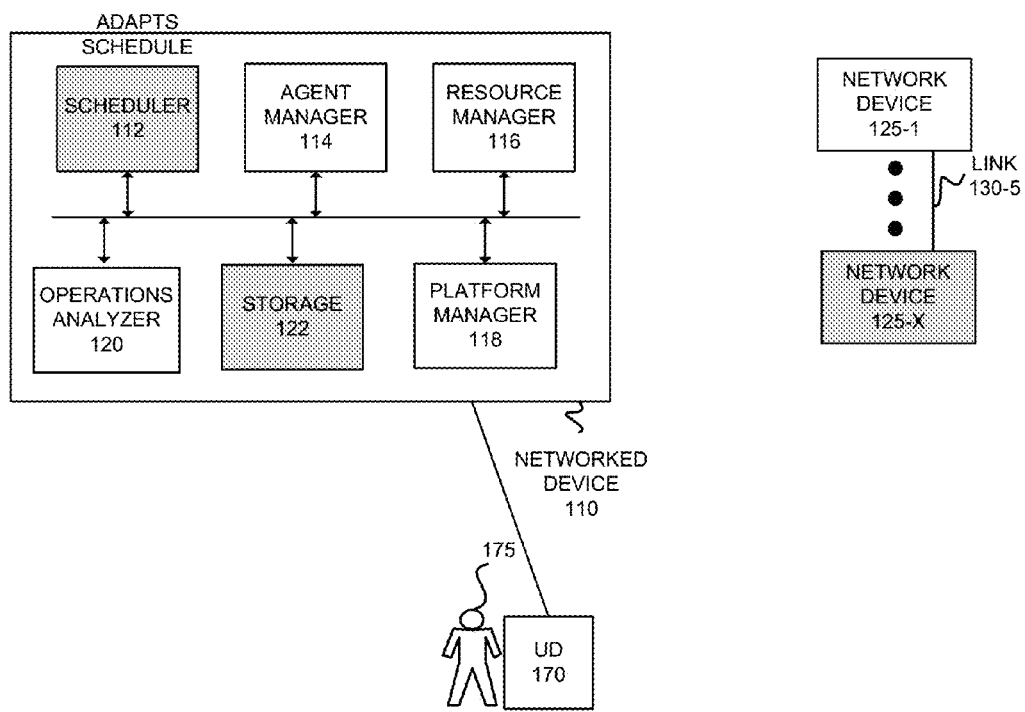

Referring to FIG. 2H, assume scheduler 112 elects to use off-node, adaptive scheduling. During the off-node, adaptive process, scheduler 112 selects one or multiple of the processes to move off-node. In addition to the resource inefficiency profile, which may reflect a more accurate representation of the resource utilization within the networked environment relative to when a current schedule was calculated, scheduler 112 uses resource profiles, virtual profiles, and job requests to calculate the adapted schedule. According to this scenario, assume scheduler 112 determines to move application 1, container 1 to networked device 125-X. Scheduler 112 calculates an adapted schedule for networked device 125-X and publishes the adapted schedule. Scheduler 112 may also communicate with platform manager 118 to cause the process of application 1, container 1 to be moved from networked device 125-1 to networked device 125-X.

Figure 3:
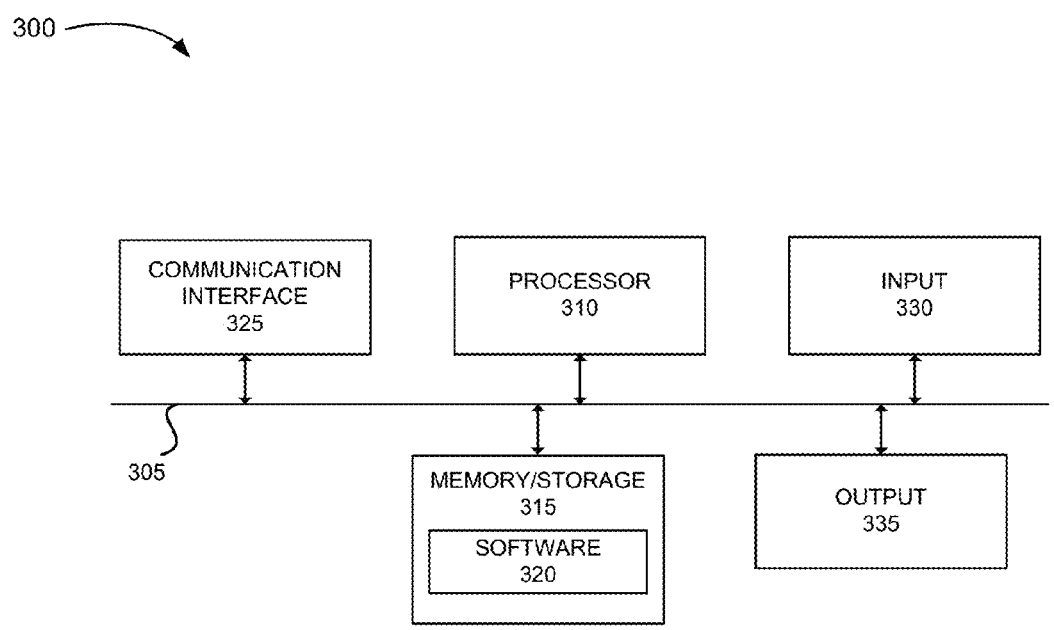
FIG. 3 is a diagram illustrating exemplary components of a device that may correspond to one or more of the devices depicted in the exemplary environment of FIG. 1A.

FIG. 3 is a diagram illustrating exemplary components of a device 300 that may correspond to one or more of the devices in environment 100. For example, device 300 may correspond to networked device 110, networked device 125, networked device 150, and/or user device 170. As illustrated in FIG. 3, according to an exemplary embodiment, device 300 includes a bus 305, processor 310, memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, and/or clocks.

Processor 310 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc.

Processor 310 may control the overall operation or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, etc.

Memory/storage 315 includes one or multiple memories and/or one or multiple other types of storage mediums. For example, memory/storage 315 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 315 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 315 may include drives for reading from and writing to the storage medium.

Memory/storage 315 may be external to and/or removable from device 300, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 315 may store data, software, and/or instructions related to the operation of device 300.

Software 320 includes an application or a program that provides a function and/or a process. Software 320 is also intended to include firmware, middleware, microcode, hardware description language (HDL), and/or other form of instruction. By way of example, with respect to networked device 110, according to an exemplary implementation, components of the management service illustrated in FIG. 1B, may be implemented to include software 320. Additionally, for example, with respect to networked device 125, according to an exemplary implementation, components depicted in FIG. 1C may be implemented to include software 320.

Communication interface 325 permits device 300 to communicate with other devices, networks, systems, devices, and/or the like. Communication interface 325 includes one or multiple wireless interfaces and/or wired interfaces. For example, communication interface 325 may include one or multiple transmitters and receivers, or transceivers. Communication interface 325 may include an antenna. Communication interface 325 may operate according to a protocol stack and a communication standard.

Input 330 permits an input into device 300. For example, input 330 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 335 permits an output from device 300. For example, output 335 may include a speaker, a display, a light, an output port, and/or some other type of visual, auditory, tactile, etc., output component. According to some embodiments, input 330 and/or output 335 may be a device that is attachable to and removable from device 300.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a process described herein. Alternatively, for example, according to other implementations, device 300 performs a process described herein based on the execution of hardware (processor 310, etc.).

Figure 6A:
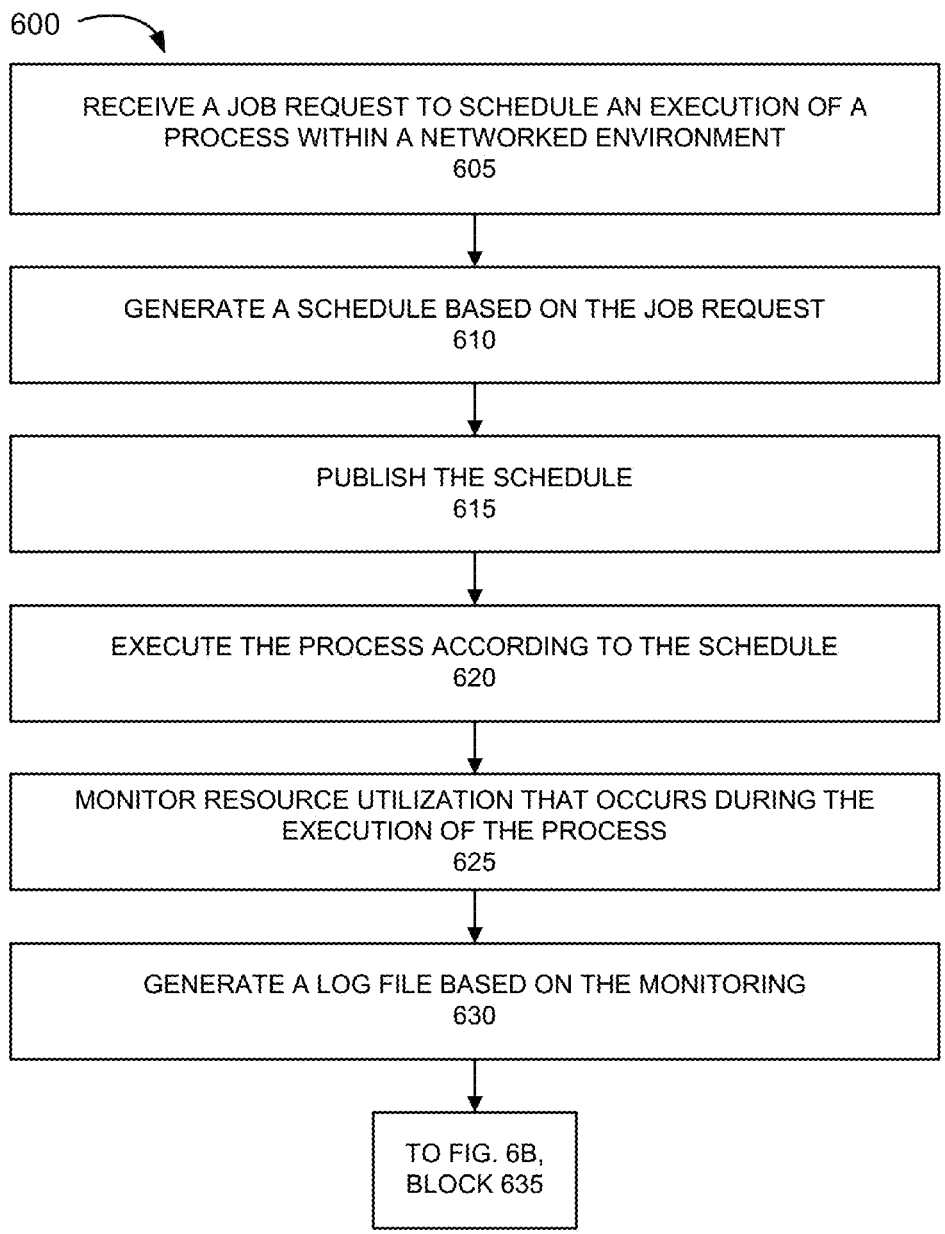
FIGS. 6A and 6B are flow diagrams that illustrate an exemplary process pertaining to the management service.
Figure 6B:
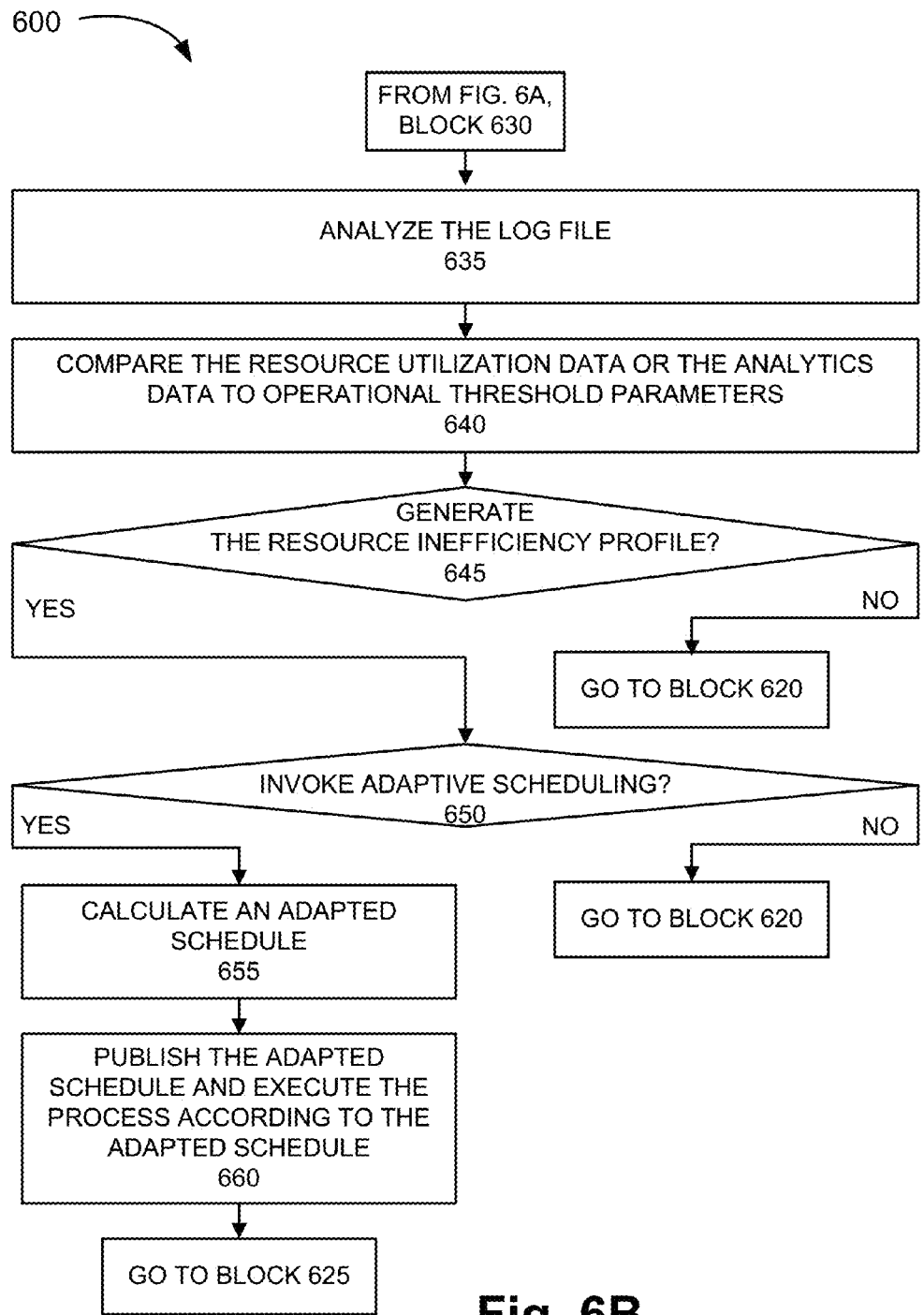

FIGS. 6A and 6B are flow diagrams illustrating an exemplary process 600 pertaining to the management service. Process 600 is directed to a process previously described above with respect to FIGS. 2A-2H and elsewhere in this description, in which networked device 110 provides a management service that includes an adaptive scheduling service. According to an exemplary embodiment, networked device 110 performs some of the steps described in process 600. For example, processor 310 may execute software 320 to provide the adaptive scheduling service. Additionally, for example, a networked device (e.g., networked device 125) performs some of the other steps described in process 600. For example, processor 310 may execute software 320 to provide the step described.

As described, according to an exemplary embodiment, process 600 is performed in a networked environment. Referring to FIG. 6A, in block 605, a job request to schedule an execution of a process within a networked environment is received. For example, scheduler 112 of networked device 110 receives a job request to schedule a process. The job request may include various data and parameters. For example, the job request may include service description data. The job request may include a timeslot profile that includes projection parameters, timing parameters and/or adaptive scheduling parameters.

In block 610, a schedule is generated based on the job request. For example, scheduler 112 generates a schedule for the process based on the job request. Scheduler 112 may select and use virtual profiles, resource profiles, current schedules pertaining to other processes, job requests pertaining to other processes, etc., to generate the schedule.

In block 615, the schedule is published. For example, scheduler 112 publishes the schedule via a publication service. A networked device (e.g., networked device 125, networked device 150) may subscribe to the publication service so as to receive schedules generated by scheduler 112.

In block 620, the process is executed according to the schedule. For example, a networked device (e.g., networked device 125, networked device 150) of the networked environment executes the process according to the schedule. The processes may involve one or multiple networked devices, one or multiple applications 129, one or multiple containers 131, etc. The process may or may not include transmission and/or reception of data between networked devices, etc.

In block 625, resource utilization that occurs during the execution of the process is monitored. For example, remote management agent 135 of the networked device (e.g., networked device 125 and/or networked device 150) monitors resource utilization. A timeframe of the monitoring includes a time period when the process is executed.

In block 630, a log file is generated based on the monitoring. For example, remote management agent 135 generates the log file (also referred to as the resource utilization data) based on the monitoring. Remote management agent 135 transmits the log file to networked device 110. The log file is received by networked device 110 and stored in storage 122.

Referring to FIG. 6B, in block 635, the log file is analyzed. For example, operations analyzer 120 of networked device 110 analyzes the log file. During the analysis, operations analyzer 120 may perform various operations, such as for example, reading and evaluating the resource utilization data, identifying dependencies between resource utilization data files (e.g., based on process identifiers), calculating execution statistics (e.g., process execution durations, wait times for resources, response times, network latency, network round trip, resource utilization levels, rates at which swapping memory to and from disk, queue levels, etc.), identifying instances of contention between processes (e.g., commands being aborted, etc.), identifying resource inefficiencies resulting from contentions, bottlenecks, etc., evaluating resource performance metrics, and the like.

As previously described, operations analyzer 120 may or may not use the historical threshold parameter. Thus, according to other exemplary implementations, process 600 may include a step in which operations analyzer 120 determines whether to analyze the log file.

In block 640, the resource utilization data or the analytics data is compared to operational threshold parameters. For example, operations analyzer 120 compares resource utilization data or analytics data to operational threshold values.

In block 645, it is determined whether to generate the resource inefficiency profile. For example, when operations analyzer 120 determines that the resource utilization data or the analytics data satisfies the operational threshold values, operations analyzer 120 determines not to generate the resource inefficiency profile. Alternatively, when operations analyzer 120 determines that the resource utilization data or the analytics data does not satisfy the operational threshold values, operations analyzer 120 determines to generate the resource inefficiency profile.

As illustrated, when it is determined not to generate the resource inefficiency profile in block 645—NO, process 600 may continue to block 620. When it is determined to generate the resource inefficiency profile in block 645—YES, it is determined whether to invoke adaptive scheduling in block 650. For example, operations analyzer 120 generates the resource inefficiency profile, as previously described. Additionally, according to some exemplary embodiments, based on a result of the comparison, operations analyzer 120 determines whether to notify scheduler 112. For example, operations analyzer 120 may use difference values and different threshold values. Alternatively, according to other exemplary embodiments, operations analyzer 120 may not make such a determination. That is, when operations analyzer 120 determines that the resource utilization data or the analytics data does not satisfy the operational threshold values, operations analyzer 120 determines to notify or provide the resource inefficiency profile to scheduler 112. According to this example, process 600 includes the determining step.

When it is determined to invoke the adaptive scheduling in block 650—YES, an adapted schedule is calculated in block 655. For example, scheduler 112 invokes the adaptive scheduling service based on a communication from operations analyzer 120. Scheduler 112 analyzes the resource inefficiency profile, selects a virtual profile and a resource profile pertaining to processes under examination, and other data (e.g., job requests, etc.), as previously described. Scheduler 112 may determine whether there are any restrictions or prohibitions pertaining to a process to which the resource inefficiency profile is directed. Scheduler 112 selects one or multiple adaptive scheduling techniques to address the resource inefficiencies. Based on the adaptive scheduling technique, scheduler 112 generates an adapted schedule, as previously described.

In block 660, publish the adapted schedule and execute the process according to the adapted schedule. For example, scheduler 112 publishes the adapted schedule. A networked device (e.g., networked device 125, networked device 150) executes the process according to the adapted schedule. Process 600 may continue by returning to block 625 in which the execution of the process according to the adapted schedule is monitored, etc.

When it is determined to not invoke the adaptive scheduling in block 650—NO, process 600 may continue to block 620.

Although FIGS. 6A and 6B illustrate an exemplary process pertaining to the management service that includes the adaptive scheduling service, according to other embodiments, process 600 may include additional operations, fewer operations, and/or different operations than those illustrated in FIGS. 6A and 6B, and as described herein.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The term "exemplary," as used herein means "serving as an example." Any embodiment or implementation described as "exemplary" is not necessarily to be construed as preferred or advantageous over other embodiments or implementations.

In addition, while a series of blocks has been described with regard to the process illustrated in FIGS. 6A and 6B, the order of the blocks may be modified according to other embodiments. Further, non-dependent blocks may be performed in parallel or simultaneously. For example, according to an exemplary implementation, two or more operations may be performed using parallel processing or a multitasking procedure. Additionally, other processes described in this description may be modified and/or non-dependent operations may be performed in parallel or simultaneously.

The embodiments described herein may be implemented in many different forms of software executed by hardware. For example, a process or a function may be implemented as "logic" or as a "component." The logic or the component may include, for example, hardware (e.g., processor 310, etc.), or a combination of hardware and software (e.g., software 320). The embodiments have been described without reference to the specific software code since the software code can be designed to implement the embodiments based on the description herein and commercially available software design environments/languages.

In the preceding specification, various embodiments have been described with reference to the accompanying drawings. However, various modifications and changes may be made thereto, and additional embodiments may be implemented, without departing from the broader scope of the invention as set forth in the claims that follow and various obvious modifications and equivalent arrangements. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

Additionally, embodiments described herein may be implemented as a non-transitory storage medium that stores data and/or information, such as instructions, program code, a computer program, software, a software application, a data structure, a program module, an application, machine code, a file that can be executed using an interpreter, etc. The program code, instructions, application, etc., is readable and executable by a processor (e.g., processor 310) of a computational device. A non-transitory storage medium includes one or more of the storage mediums described in relation to memory/storage 315.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction described in the present application should be construed as critical or essential to the embodiments described herein unless explicitly described as such.

What is claimed is:

1. A method comprising:
   receiving, by a networked device of a networked environment, a job request, from a user device, to schedule an execution of a process in the networked environment;
   generating, by the networked device, a schedule for the execution of the process in response to the receiving;
   concurrently executing, by another networked device of the networked environment, the process according to the schedule and one or more other processes according to one or more current schedules;
   obtaining, by the networked device, resource utilization data indicating resource usage stemming from the concurrently executing;
   analyzing, by the networked device, the resource utilization data;
   determining, by the networked device, whether a resource inefficiency occurred during the concurrently executing based on the analyzing, wherein the determining comprises:
      comparing a value of the resource utilization data to an operational threshold value;
      determining whether the value of the resource utilization data satisfies the operational threshold value based on the comparing;
   calculating a difference value in response to determining that the value of the resource utilization data does not satisfy the operational threshold value, wherein the difference value indicates a difference in value between the value of the resource utilization data and the operational threshold value;
   comparing the difference value to a difference threshold value; and
   determining whether to generate an adapted schedule based on the comparing of the difference value to the difference threshold value;
   generating, by the networked device, resource inefficiency data in response to determining that the resource inefficiency occurred during the concurrently executing; and
   generating, by the networked device, the adapted schedule for at least one of the process or the one or more other processes in response to determining that the difference value does not satisfy the difference threshold value.

2. The method of claim 1, further comprising:
   generating execution statistics data based on the analyzing of the resource utilization data; and wherein the generating the resource inefficiency data further comprises:
   generating the resource inefficiency data based on an analysis of the at least one of the execution statistics data or the resource utilization data, and wherein when the concurrently executing includes at least one of a transmission of data from the other networked device or a reception of data by the other networked device, the resource utilization data pertains to the other networked device and one or more links of the networked environment via which the transmission of the data or the reception of the data occurred.

3. The method of claim 1, wherein determining whether the resource inefficiency occurred further comprises:
   omitting to generate the resource inefficiency data based on determining that the value of the resource utilization data satisfies the operational threshold value.

4. The method of claim 1,
   wherein the job request includes a time-shift restriction parameter that indicates a maximum time offset that can be used for adaptive scheduling.

5. The method of claim 1, wherein generating the adapted schedule further comprises:
   calculating one or more time offsets pertaining to at least one of the process or the one or more other processes, wherein each of the one or more time offsets indicates a time shift relative to a time instance of execution according to at least one of the one or more current schedules or the schedule; and
   generating the adapted schedule based on the one or more time offsets.

6. The method of claim 5, further comprising:
   determining an execution signature pattern pertaining to the at least one of the process or the one or more other processes; and
   calculating the one or more time offsets based on the determining of the execution signature pattern.

7. The method of claim 1, wherein generating the adapted schedule further comprises:
   determining which of at least one of the process or the one or more other processes to move to a target networked device of the networked environment, which is different from the other networked device;
   tearing down the at least one of the process or the one or more other processes in response to determining which of the at least one of the process or the one or more other processes to move; and
   setting up, at the target networked device, the at least one of the process or the one or more other processes in response to the tearing down, and wherein the generating further comprises:
   generating the adapted schedule based on the tearing down and the setting up.

8. The method of claim 1, further comprising:
   publishing the adapted schedule; and
   concurrently executing the at least one of the process or the one or more other processes based on the adapted schedule.

9. A networked device of a networked environment comprising:
   a communication interface;
   a memory, wherein the memory stores instructions; and
   a processor, wherein the processor executes the instructions to:
      receive, via the communication interface, from a user device, a job request to schedule an execution of a process in the networked environment;
      generate a schedule for the execution of the process in response the receipt of the job request, wherein the schedule is generated based on one or more current schedules directed to concurrent execution of one or more other processes;

obtain resource utilization data indicating resource usage stemming from the concurrent execution of the process and the one or more other processes occurring on another networked device of the networked environment;

analyze the resource utilization data;

determine whether a resource inefficiency occurred during the concurrent execution based on the analysis of the resource utilization data, wherein, when determining the processor further executes instructions to:

compare a value of the resource utilization data to an operational threshold value;

determine whether the value of the resource utilization data satisfies the operational threshold value based on the comparison;

calculate a difference value in response to a determination that the value of the resource utilization data does not satisfy the operational threshold value, wherein the difference value indicates a difference in value between the value of the resource utilization data and the operational threshold value;

compare the difference value to a difference threshold value; and determine whether to generate an adapted schedule based on the comparison of the difference value to the difference threshold value;

generate resource inefficiency data in response to a determination that the resource inefficiency occurred during the concurrent execution; and generate the adapted schedule for at least one of the process or the one or more other processes in response to a determination that the difference value does not satisfy the difference threshold value.

10. The networked device of claim 9, wherein the processor further executes the instructions to:

generate execution statistics data based on the analysis of the resource utilization data; and wherein when generating the resource inefficiency data, the processor further executes the instructions to:

generate the resource inefficiency data based on an analysis of the at least one of the execution statistics data or the resource utilization data, and wherein when the concurrent execution includes at least one of a transmission of data from the other networked device or a reception of data by the other networked device, the resource utilization data pertains to the other networked device and one or more links of the networked environment via which the transmission of the data or the reception of the data occurred.

11. The networked device of claim 9, wherein when determining whether the resource inefficiency occurred, the processor further executes the instructions to:

omit to generate the resource inefficiency data based on a determination that the value of the resource utilization data satisfies the operational threshold value.

12. The networked device of claim 9, wherein the job request includes a time-shift restriction parameter that indicates a maximum time offset that can be used for adaptive scheduling.

13. The networked device of claim 9, wherein the processor further executes the instructions to:

calculate one or more time offsets pertaining to at least one of the process or the one or more other processes, wherein each of the one or more time offsets indicates a time shift relative to a time instance of execution according to at least one of the one or more current schedules or the schedule; and generate the adapted schedule based on the one or more time offsets.

14. The networked device of claim 13, wherein the processor further executes the instructions to:

determine an execution signature pattern pertaining to the at least one of the process or the one or more other processes; and calculate the one or more time offsets based on the determination of the execution signature pattern.

15. The networked device of claim 9, wherein when generating the adapted schedule, the processor further executes the instructions to:

determine which of at least one of the process or the one or more other processes to move to a target networked device of the networked environment, which is different from the other networked device on which the concurrent execution occurred;

tear down the at least one of the process or the one or more other processes in response to a determination which of the at least one of the process or the one or more other processes to move;

set up, at the target networked device, the at least one of the process or the one or more other processes in response to the tear down; and generate the adapted schedule based on the tear down and the set up.

16. A non-transitory, computer-readable storage medium storing instructions executable by a processor of a computational device of a networked environment, which when executed cause the computational device to:

receive a job request to schedule an execution of a process in the networked environment from a user device;

generate a schedule for the execution of the process in response to the receipt of the job request, wherein the schedule is generated based on one or more current schedules directed to concurrent execution of one or more other processes;

obtain resource utilization data indicating resource usage stemming from the concurrent execution of the process and the one or more other processes occurring on another computational device of the networked environment;

analyze the resource utilization data;

determine whether a resource inefficiency occurred during the concurrent execution based on the analysis of the resource utilization data, wherein the instructions to determine comprises instructions to:

compare a value of the resource utilization data to an operational threshold value;

determine whether the value of the resource utilization data satisfies the operational threshold value based on the comparison;

calculate a difference value in response to a determination that the value of the resource utilization data does not satisfy the operational threshold value, wherein the difference value indicates a difference in value between the value of the resource utilization data and the operational threshold value;

compare the difference value to a difference threshold value; and determine whether to generate an adapted schedule based on the comparison between the difference value and the difference threshold value;

generate resource inefficiency data in response to a determination that the resource inefficiency occurred during the concurrent execution; and generate the adapted schedule for at least one of the process or the one or more other processes in response to a determination that the difference value does not satisfy the difference threshold value.

17. The non-transitory, computer-readable storage medium of claim 16, wherein the instructions further comprise instructions to:

omit to generate the resource inefficiency data based on a determination that the value of the resource utilization data satisfies the operational threshold value.

18. The non-transitory, computer-readable storage medium of claim 16, wherein the instructions further comprise instructions to:

omit to generate the adapted schedule in response to a determination that the difference value satisfies the difference threshold value.

19. The non-transitory, computer-readable storage medium of claim 16, wherein the instructions further comprise instructions to:

calculate one or more time offsets pertaining to at least one of the process or the one or more other processes, wherein each of the one or more time offsets indicates a time shift relative to a time instance of execution according to at least one of the one or more current schedules or the schedule; and generate the adapted schedule based on the one or more time offsets.

20. The non-transitory, computer-readable storage medium of claim 16, wherein the instructions further comprise instructions to:

determine which of at least one of the process or the one or more other processes to move to a target computational device of the networked environment, which is different from the other computational device on which the concurrent execution occurred;

tear down the at least one of the process or the one or more other processes in response to a determination which of the at least one of the process or the one or more other processes to move;

set up, at the target computational device, the at least one of the process or the one or more other processes in response to the tear down; and generate the adapted schedule based on the tear down and the set up.

\* \* \* \* \*